US008913620B2

(12) United States Patent
Basso et al.

(10) Patent No.: US 8,913,620 B2
(45) Date of Patent: *Dec. 16, 2014

(54) MULTICAST TRAFFIC GENERATION USING HIERARCHICAL REPLICATION MECHANISMS FOR DISTRIBUTED SWITCHES

(75) Inventors: Claude Basso, Nice (FR); Todd A. Greenfield, Rochester, MN (US); Bruce M. Walk, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 111 days.

This patent is subject to a terminal disclaimer.

(21) Appl. No.: 13/420,203

(22) Filed: Mar. 14, 2012

(65) Prior Publication Data

US 2013/0242986 A1 Sep. 19, 2013

(51) Int. Cl.
| | |
|---|---|
| H04L 12/28 | (2006.01) |
| H04L 1/00 | (2006.01) |
| H04L 12/66 | (2006.01) |
| H04H 20/71 | (2008.01) |
| H04J 3/16 | (2006.01) |
| H04J 3/24 | (2006.01) |
| H04J 3/26 | (2006.01) |
| G06F 15/173 | (2006.01) |
| H04W 72/00 | (2009.01) |

(52) U.S. Cl.
USPC ........ 370/396; 370/230.1; 370/312; 370/353; 370/360; 370/390; 370/395.53; 370/395.41; 370/400; 370/401; 370/419; 370/432; 370/469; 370/475; 709/226; 709/238; 455/453

(58) Field of Classification Search
CPC ...................................................... H04L 45/16

USPC ......... 370/355, 360, 367, 390, 392, 396–398, 370/395.41, 401, 408, 428, 432
See application file for complete search history.

(56) References Cited

U.S. PATENT DOCUMENTS 5,689,505 A 11/1997 Chiussi et al.
5,790,546 A * 8/1998 Dobbins et al. ............... 370/400
(Continued)

FOREIGN PATENT DOCUMENTS

JP 2008141361 A 6/2008

OTHER PUBLICATIONS

Suman Banerjee, et al., "Construction of an Efficient Overlay Multicast Infrastructure for Real-Time Applications", IEEE InfoCom 2003, 22nd Annual Joint Conference of the IEEE Computer and Communications, vol. 2, pp. 1521-1531.

(Continued)

Primary Examiner — Un C Cho
Assistant Examiner — Peian Lou
(74) Attorney, Agent, or Firm — Patterson & Sheridan, LLP

(57) ABSTRACT

A distributed switch may include a hierarchy with one or more levels of surrogate sub-switches (and surrogate bridge elements) that enable the distributed switch to scale bandwidth based on the size of the membership of a multicast group. When a sub-switch receives a multicast data frame, it forwards the packet to one of the surrogate sub-switches. Each surrogate sub-switch may then forward the packet to another surrogate in a different hierarchical level or to a destination computing device. Because the surrogates may transmit the data frame in parallel using two or more connection interfaces, the bandwidth used to forward the multicast packet increases for each surrogate used.

11 Claims, 24 Drawing Sheets

(56) References Cited

U.S. PATENT DOCUMENTS

| | | | |
|---|---|---|---|
| 6,049,878 A | 4/2000 | Caronni et al. | |
| 6,331,983 B1 * | 12/2001 | Haggerty et al. | 370/400 |
| 6,910,149 B2 * | 6/2005 | Perloff et al. | 714/4.3 |
| 6,940,856 B2 | 9/2005 | Vu | |
| 6,963,563 B1 | 11/2005 | Wong et al. | |
| 7,373,394 B1 | 5/2008 | Li et al. | |
| 7,406,521 B2 | 7/2008 | Saxena | |
| 7,486,678 B1 | 2/2009 | Devanagondi et al. | |
| 7,545,735 B1 | 6/2009 | Shabtay et al. | |
| 7,668,081 B2 | 2/2010 | Hermsmeyer et al. | |
| 7,697,525 B2 | 4/2010 | Zelig et al. | |
| 7,720,076 B2 * | 5/2010 | Dobbins et al. | 370/395.53 |
| 7,835,397 B2 | 11/2010 | Clarke et al. | |
| 7,864,769 B1 | 1/2011 | Woo et al. | |
| 7,899,045 B2 | 3/2011 | Shankara | |
| 8,077,610 B1 | 12/2011 | Arad et al. | |
| 8,270,395 B2 | 9/2012 | Kompella | |
| 8,351,431 B2 | 1/2013 | Assarpour | |
| 2003/0107988 A1 | 6/2003 | Lodha et al. | |
| 2003/0198241 A1 | 10/2003 | Putcha et al. | |
| 2003/0223430 A1 | 12/2003 | Lodha et al. | |
| 2005/0180446 A1 | 8/2005 | Flowers et al. | |
| 2010/0157844 A1 | 6/2010 | Casey et al. | |
| 2011/0261815 A1 | 10/2011 | Armstrong et al. | |
| 2011/0273980 A1 | 11/2011 | Smith | |

OTHER PUBLICATIONS

International Search Report and Written Opinion of the ISA dated May 28, 2013—International Application No. PCT/IB2013/051525.

U.S. Patent Application entitled "Multicast Bandwidth Multiplication for a Unified Distributed Switch", filed Mar. 14, 2012 by Claude Basso et al.

U.S. Patent Application entitled "Dynamic Optimization of a Multicast Tree Hierarchy for a Distributed Switch", filed Mar. 14, 2012 by Claude Basso et al.

U.S. Patent Application entitled "Delivering Multicast Frames to Aggregated Link Trunks in a Distributed Switch", filed Mar. 14, 2012 by Claude Basso et al.

* cited by examiner

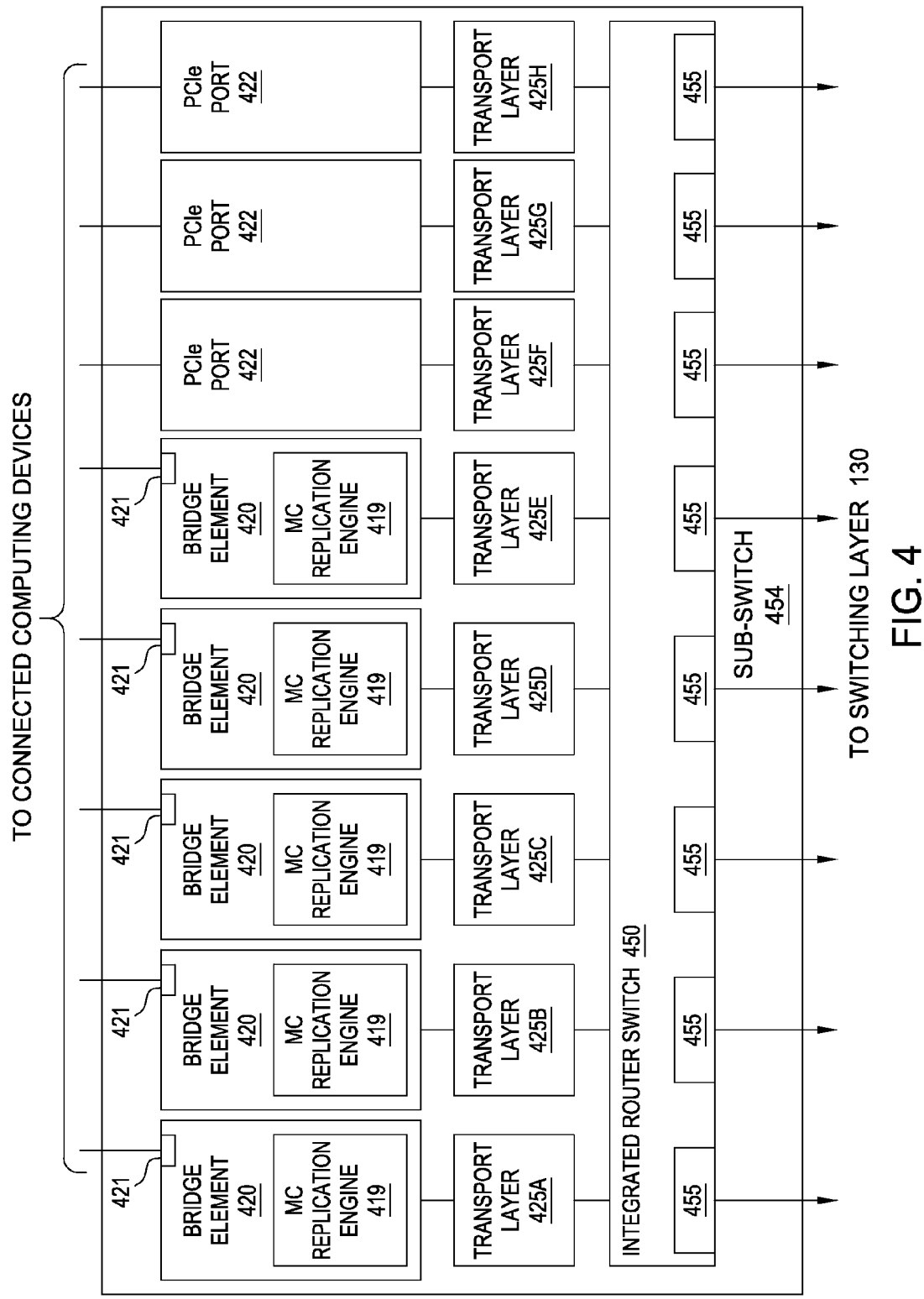

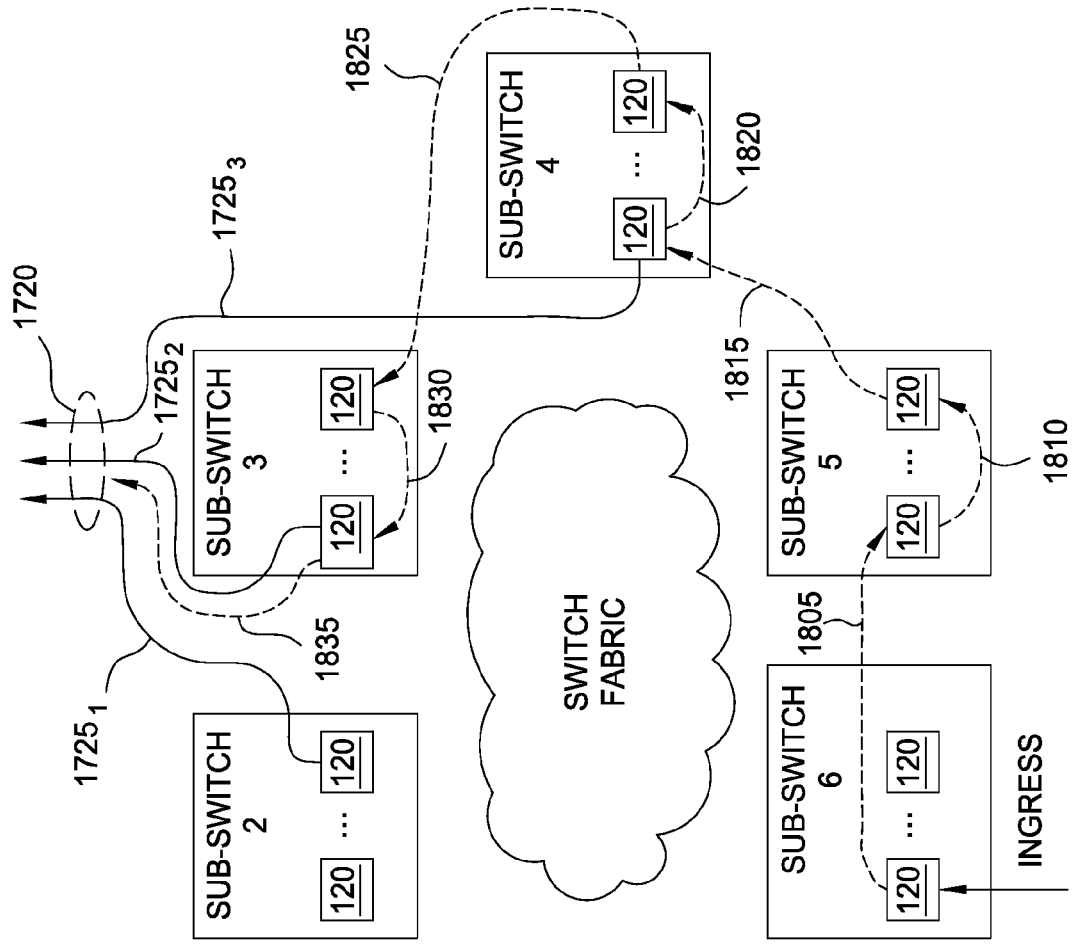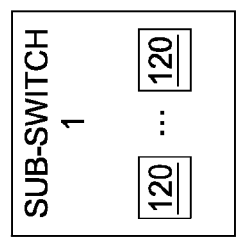
FIG. 18

MULTICAST TRAFFIC GENERATION USING HIERARCHICAL REPLICATION MECHANISMS FOR DISTRIBUTED SWITCHES

CROSS-REFERENCE TO RELATED APPLICATIONS

This application is related to co-pending U.S. patent application Ser. No. 13/420,180; co-pending U.S. patent application Ser. No. 13/420,232; and co-pending U.S. patent application Ser. No. 13/420,259, which were all filed on the same day as the present application. Each of the aforementioned related patent applications is herein incorporated by reference in its entirety.

BACKGROUND

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

A multicast data frame requires a switch to forward data to all members of a multicast group. That is, for each single multicast data frame received by the switch, the switch creates and forwards a copy of the data frame to every member of the multicast group. As the group's membership grows, the switch must forward the data frame to more and more compute nodes.

SUMMARY

Embodiments of the invention provide a method and computer program product for forwarding a multicast data frame in a distributed switch comprising a plurality of switches. The method and computer program product comprise receiving a multicast data frame on a receiving port of an ingress switch in the distributed switch and determining destination switches in the distributed switch. The method and computer program product comprise forwarding at a least a portion of the multicast data frame to a first surrogate switch in a hierarchy where the first surrogate switch is assigned in the hierarchy to forward the portion to at least one of: one of the destination switches and a second surrogate switch in the hierarchy. Furthermore, the first surrogate switch increases bandwidth used for forwarding the portion of the data frame within the distributed switch by forwarding the portion of the data frame to at least two switches in the distributed switch in parallel via at least two respective connection interfaces.

Another embodiment provides a distributed switch comprising a plurality of switches. The distributed switch includes an ingress switch that receives a multicast data frame on a receiving port of the ingress switch in the distributed switch and determines destination switches in the distributed switch. The distributed switch also includes a first surrogate switch in a hierarchy of switches where the first surrogate switch receives at least a portion of the multicast data frame from the ingress switch and where the first surrogate switch is assigned in the hierarchy to forward the portion to at least one of: one of the destination switches and a second surrogate switch in the hierarchy. Furthermore, the first surrogate switch increases bandwidth used for forwarding the portion of the data frame within the distributed switch by forwarding the portion of the data frame to at least two switches in the distributed switch in parallel via at least two respective connection interfaces.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

FIG. 4 illustrates a sub-switch of FIG. 2 that is capable of bandwidth multiplication, according to one embodiment described herein.

FIG. 18 illustrates transmitting a multicast data frame to a physical link of a trunk using surrogates, according to one embodiment described herein.

DETAILED DESCRIPTION

Figure 1:
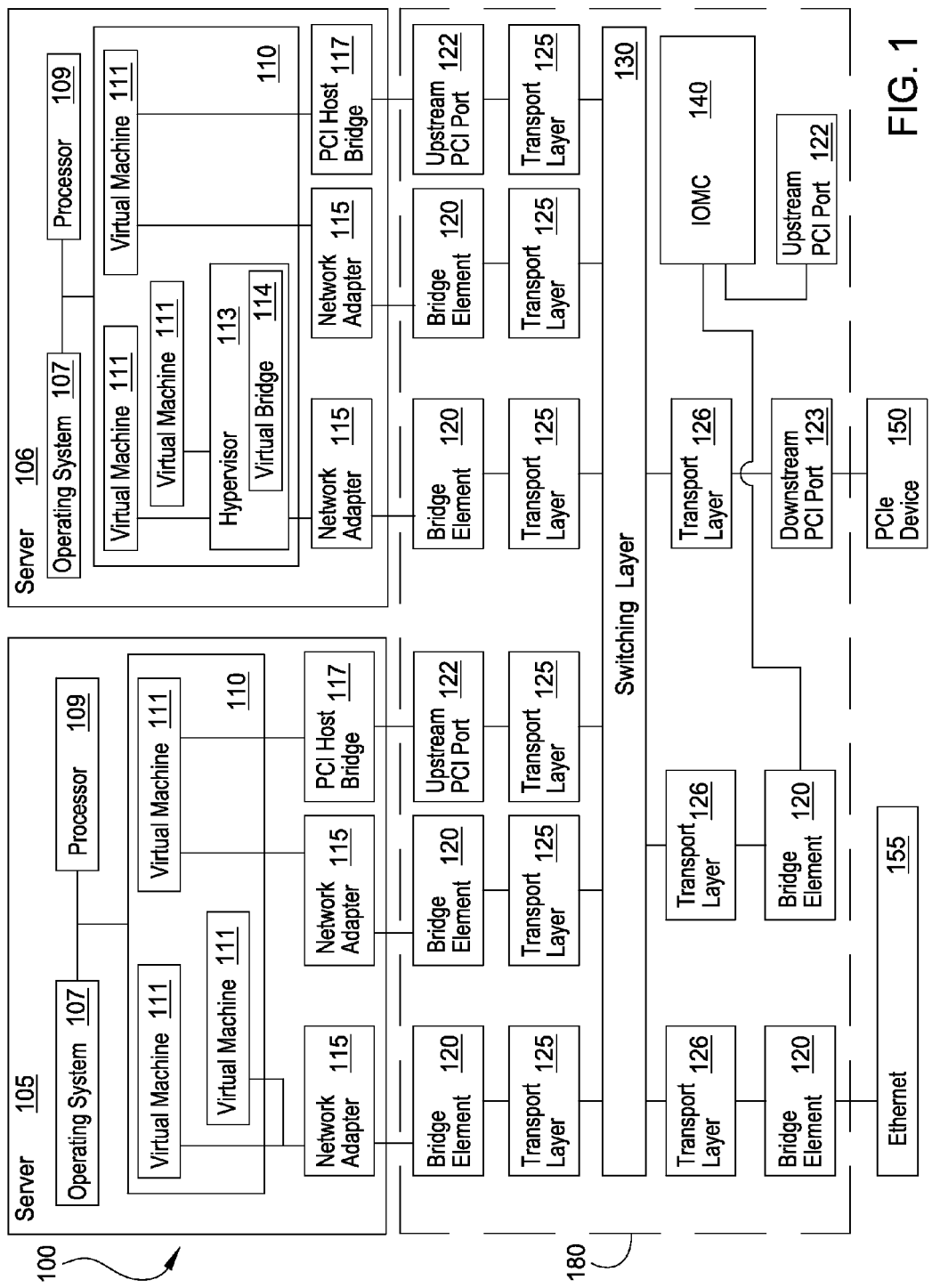
FIG. 1 illustrates a system architecture that includes a distributed, virtual switch, according to one embodiment described herein.

A distributed, virtual switch may appear as a single switch element to a computing system (e.g., a server) connected to the distributed switch. In reality, the distributed switch may include a plurality of different switch modules that are interconnecting via a switching layer such that each of the switch modules may communicate with any other of the switch modules. For example, a computing system may be physically connected to a port of one switch module but, using the switching layer, is capable of communicating with a different switch module that has a port connected to a WAN (e.g., the Internet). To the computing system, the two separate switch modules appear to be one single switch. Moreover, each of the switch modules may be configured to accept and route data based on two different communication protocols.

The distributed switch may include a plurality of chips (i.e., sub-switches) on each switch module. These sub-switches may receive a multicast data frame (e.g., an Ethernet frame) that designates a plurality of different destination sub-switches. The sub-switch that receives the data frame is responsible for creating copies of a portion of the frame, such as the frame's payload, and forwarding that portion to the respective destination sub-switches using the fabric of the distributed switch. However, instead of simply using one egress connection interface to forward the copies of the data frame to each of the destinations sequentially, the sub-switch may use a plurality of connection interfaces to transfer copies of the data frame in parallel. For example, a sub-switch may have a plurality of Tx/Rx ports that are each associated with a connection interface that provides connectivity to the other sub-switches in the distributed switch. The port that receives the multicast data frame can borrow the connection interfaces (and associated hardware) assigned to these other ports to transmit copies of the multicast data frame in parallel.

In addition, these sub-switches may be arranged in a hierarchical structure where one or more sub-switches are selected to act as surrogates. The sub-switches of the distributed switch are grouped together where each group is assigned to one or more of the surrogates. When a sub-switch receives a multicast data frame, it forwards the packet to one of the surrogate sub-switches. Each surrogate sub-switch may then forward the packet to another surrogate or a destination computing device. Because the surrogates may also transmit the packets in parallel using two or more connection interfaces, the bandwidth used to forward the multicast packet increases for each surrogate used.

Further, the surrogate hierarchy may include a plurality of levels that form a pyramid-like arrangement where upper-level surrogates forward the multicast data frame to lower-level surrogates until the bottom of the hierarchy is reached. At the bottom of the hierarchy, the receiving sub-switch forwards the multicast data frame to a connected computing devices that is a member of the multicast group. Using the hierarchy, a multicast data frame can be forwarded through the distributed switch such that bandwidth is increased according to the size of the membership of the multicast group.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud being run or stored on the servers. For example, an application could execute on a server implementing the virtual switch in the cloud. Doing so allows a user to access this information from any computing system attached to a network connected to the cloud (e.g., the Internet).

FIG. 1 illustrates a system architecture that includes a distributed virtual switch, according to one embodiment of the invention. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may be considered to include memory storage physically located in the server 105 or on another computing device coupled to the server 105.

The server 105 may operate under the control of an operating system 107 and may execute various computer software applications, components, programs, objects, modules, and data structures, such as virtual machines 111.

The server 105 may include network adapters 115 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement of Fiber Channel over Ethernet (FCoE) protocol, RDMA over Ethernet, Internet small computer system interface (iSCSI), and the like. In general, a network adapter 115 transfers data using an Ethernet or PCI based communication method and may be coupled to one or more of the virtual machines 111. Additionally, the adapters may facilitate shared access between the virtual machines 111. While the adapters 115 are shown as being included within the server 105, in other embodiments, the adapters may be physically distinct devices that are separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge 117 would then connect to an upstream PCI port 122 on a switch element in the distributed switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed virtual switch 180. For example, a network adapter 115 and bridge element 120 may be connected using two 40 Gbit Ethernet connections or one 100 Gbit Ethernet connection. The bridge elements 120 forward the data frames received by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed switch 180.

The distributed virtual switch 180, in general, includes a plurality of bridge elements 120 that may be located on a plurality of a separate, though interconnected, hardware components. To the perspective of the network adapters 115, the switch 180 acts like one single switch even though the switch 180 may be composed of multiple switches that are physically located on different components. Distributing the switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell) that is transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect with dedicated connections which connect bridge elements 120 located within the same chassis and rack, as well as links for connecting to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the switch 180.

Although "upstream" and "downstream" are used to describe the PCI ports, this is only used to illustrate one possible data flow. For example, the downstream PCI port 123 may in one embodiment transmit data from the connected to the PCIe device 150 to the upstream PCI port 122. Thus, the PCI ports 122, 123 may both transmit as well as receive data.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special-purpose processor) is coupled to at least one bridge element 120 or upstream PCI port 122 which provides the IOMC 140 with access to the switching layer 130. One function of the IOMC 140 may be to receive commands from an administrator to configure the different hardware elements of the distributed virtual switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members (or slaves).

Figure 2:
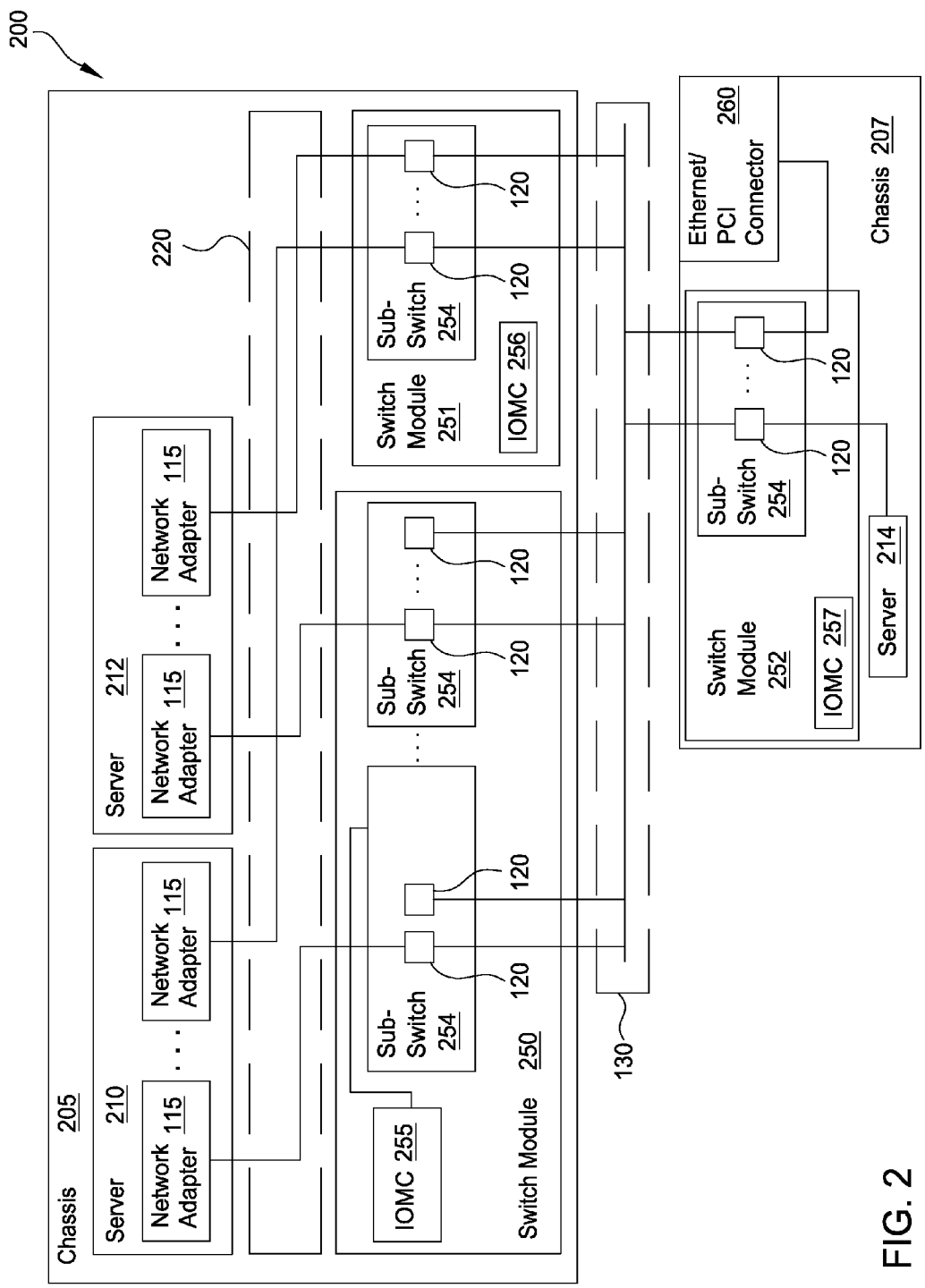
FIG. 2 illustrates the hardware representation of a system that implements a distributed, virtual switch, according to one embodiment described herein.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254 (i.e., a microchip). In one embodiment, the switch modules 250, 251, 252 are hardware components (e.g., PCB boards, FPGA boards, etc.) that provide physical support and connectivity between the network adapters 115 and the bridge elements 120. In general, the switch modules 250, 251, 252 include hardware that connects different chassis 205, 207 and servers 210, 212, 214 in the system 200 and may be a single, replaceable part in the computing system.

The switch modules 250, 251, 252 (e.g., a chassis interconnect element) include one or more sub-switches 254 and an IOMC 255, 256, 257. The sub-switches 254 may include a logical or physical grouping of bridge elements 120—e.g., each sub-switch 254 may have five bridge elements 120. Each bridge element 120 may be physically connected to the servers 210, 212. For example, a bridge element 120 may route data sent using either Ethernet or PCI communication protocols to other bridge elements 120 attached to the switching layer 130 using the routing layer. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module. As discussed above, the IOMCs 255, 256, 257 are attached to at least one sub-switch 254 (or bridge element 120) in each switch module 250, 251, 252 which enables each IOMC to route commands on the switching layer 130. For clarity, these connections for IOMCs 256 and 257 have been omitted. Moreover, switch modules 251, 252 may include multiple sub-switches 254.

The dotted line in chassis 205 defines the midplane 220 between the servers 210, 212 and the switch modules 250, 251. That is, the midplane 220 includes the data paths (e.g., conductive wires or traces) that transmit data between the network adapters 115 and the sub-switches 254.

Each bridge element 120 connects to the switching layer 130 via the routing layer. In addition, a bridge element 120 may also connect to a network adapter 115 or an uplink. As used herein, an uplink port of a bridge element 120 provides a service that expands the connectivity or capabilities of the system 200. As shown in chassis 207, one bridge element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to a switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridge elements 120 to update the routing tables and lookup tables to include the hardware elements on the new switching module.

Figure 3:
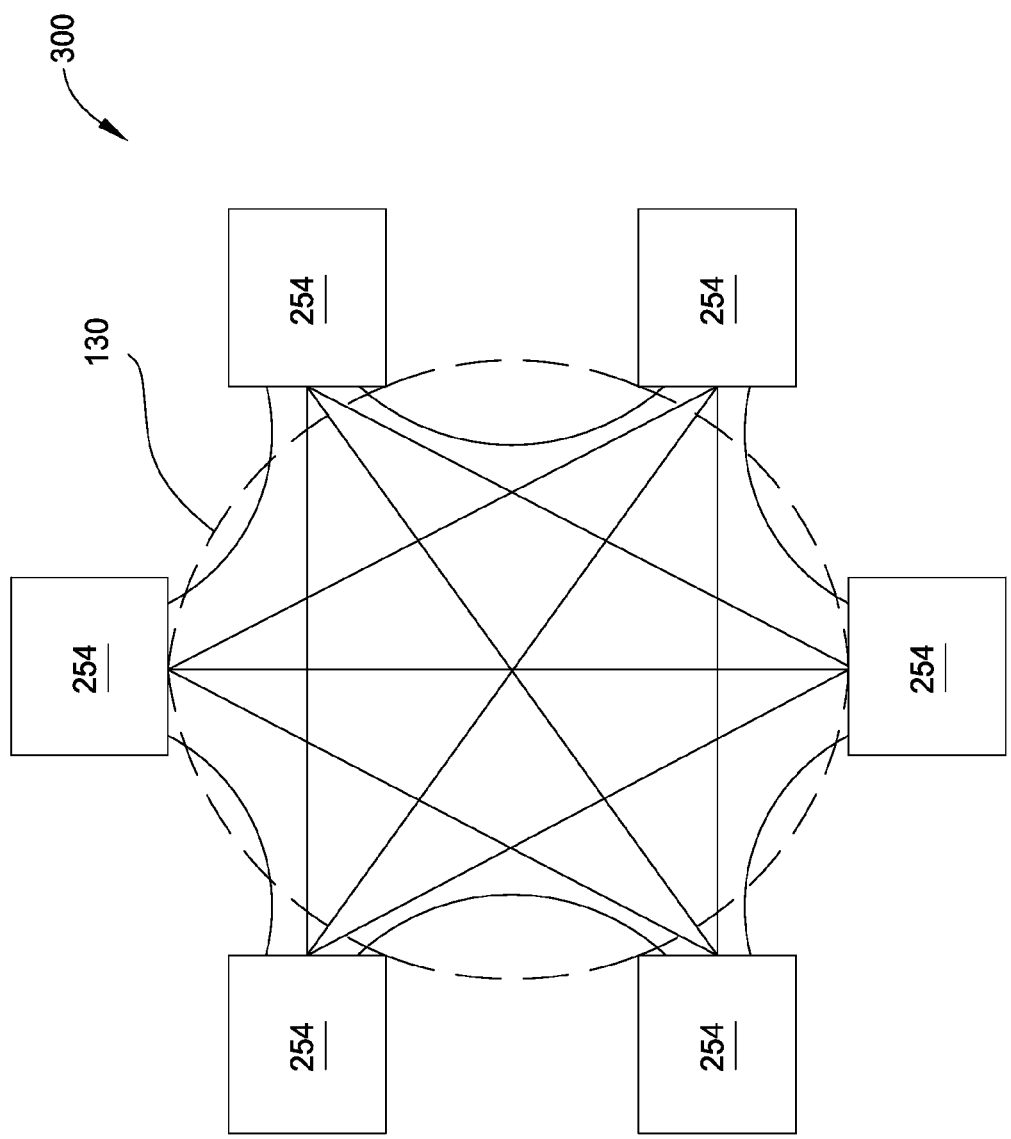
FIG. 3 illustrates a distributed, virtual switch, according to one embodiment described herein.

FIG. 3 illustrates a virtual switching layer, according to one embodiment of the invention. Each sub-switch 254 in the systems 100 and 200 are connected to each other using the switching layer 130 via a mesh connection schema. That is, no matter the sub-switch 254 used, a cell (i.e., data packet) can be routed to another other sub-switch 254 located on any other switch module 250, 251, 252. This may be accomplished by directly connecting each of the bridge elements 120 of the sub-switches 254—i.e., each bridge element 120 has a dedicated data path to every other bridge element 120. Alternatively, the switching layer 130 may use a spine-leaf architecture where each sub-switch 254 (i.e., a leaf node) is attached to at least one spine node. The spine nodes route cells received from the sub-switch 254 to the correct spine node which then forwards the data to the correct sub-switch 254. However, this invention is not limited to any particular technique for interconnecting the sub-switches 254.

Bandwidth Multiplication

FIG. 4 illustrates a sub-switch of FIG. 2 that is capable of bandwidth multiplication, according to one embodiment of the invention. As shown, sub-switch 454 (i.e., a networking element or device) includes five bridge elements 420 and three PCIe ports 422. However, the present disclosure is not limited to such and can include any number of bridge elements, PCIe ports, or ports for a different communication protocol. Alternatively, the sub-switch 454 may include only bridge elements 420. The bridge elements 420 may contain one or more ports 421 such as, for example, the 100 gigabit port or two 40 gigabit ports discussed previously. Moreover, the present disclosure is not limited to the Ethernet communication protocol but may be applied to any communication method that has a multicast functionality.

The bridge elements 420 also include a multicast (MC) replication engine 419 that performs the functions necessary to forward a multicast data frame received at the port 421 to destination computing devices. In general, a multicast data frame includes a group ID. The MC replication engine 419 uses the group ID to look up the different members of that group. In this manner, the MC replication engine 419 determines how many copies of the payload of the multicast data frame it should create and where these copies should be sent. Further, the present disclosure may also apply to a broadcast data frame. In that case, the receiving bridge element 420 forwards the data frame to every computing device connected to the distributed virtual switch 180.

Each bridge element 420 and PCIe port 422 is associated with a transport layer (TL) 425. The TLs 425 translate the data received by the bridge element 420 and the PCIe port 422 from their original format (e.g., Ethernet or PCIe) to a generic data packet—i.e., a cell. The TLs 425 also translate cells received from the switching layer 130 back to their respective communication format and then transmits the data to the respective bridge element 420 or PCIe port 422. The bridge element 420 or PCIe port 422 then forwards the translated data to a connected computing device.

The integrated switch router (ISR) 450 is connected to the transport layer and includes connection interfaces 455 (e.g., solder wires, receptacles, ports, cables, etc.) for forwarding the cells to other sub-switches in the distributed switch. In one embodiment, the sub-switch 454 has the same number of interfaces 455 as the TLs 425 though it may have more or less than the number of TLs 425 on the sub-switch 454. In one embodiment, the connection interfaces 455 are "assigned" to one or more of the TLs 425 and a bridge element 420 or PCIe port 422. That is, if the bridge element 420 or PCIe port 422 receives a unicast data frame, it would use the assigned connection interface 455 to forward the data to the switching layer 130. In one embodiment, one of the bridge elements 420 may borrow the connection interface 455 (and its buffers) assigned to another bridge element 420 to transmit copies of a multicast data frame.

Although not shown, the ISR 450 may include a crossbar switch that permits the bridge elements 420 and PCIe ports 422 on the same sub-switch 454 to share information directly. The connection interfaces 455 may be connected to the crossbar for facilitating communication between sub-switches. Moreover, portions of the ISR 450 may not be located on an ASIC comprising the sub-switch 454 but may be located external to the sub-switch (e.g., on the switch module).

Figure 5A:
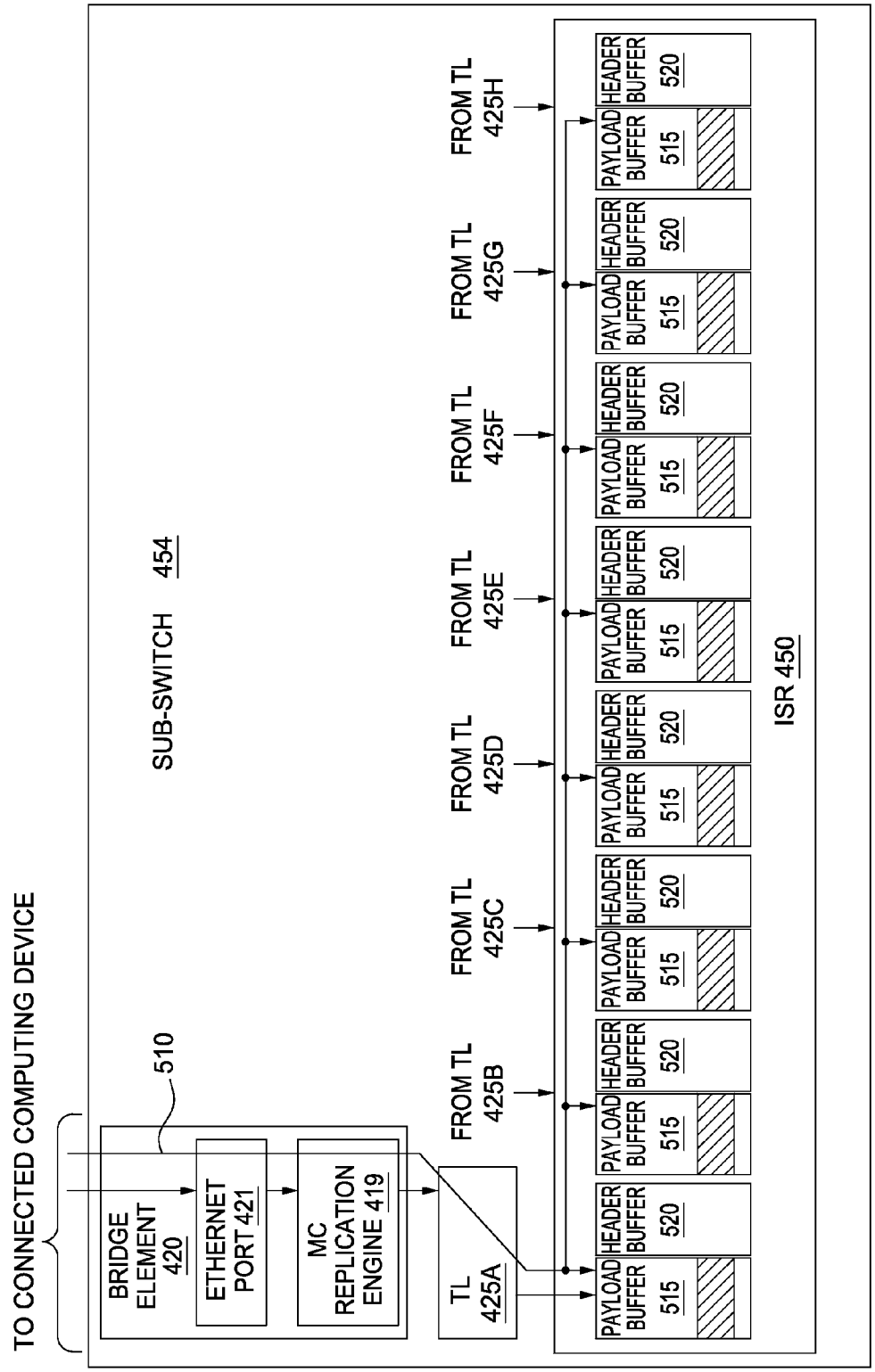
FIGS. 5A-5B illustrate performing bandwidth multiplication in the sub-switch of FIG. 4, according to embodiments described herein.
Figure 5B:
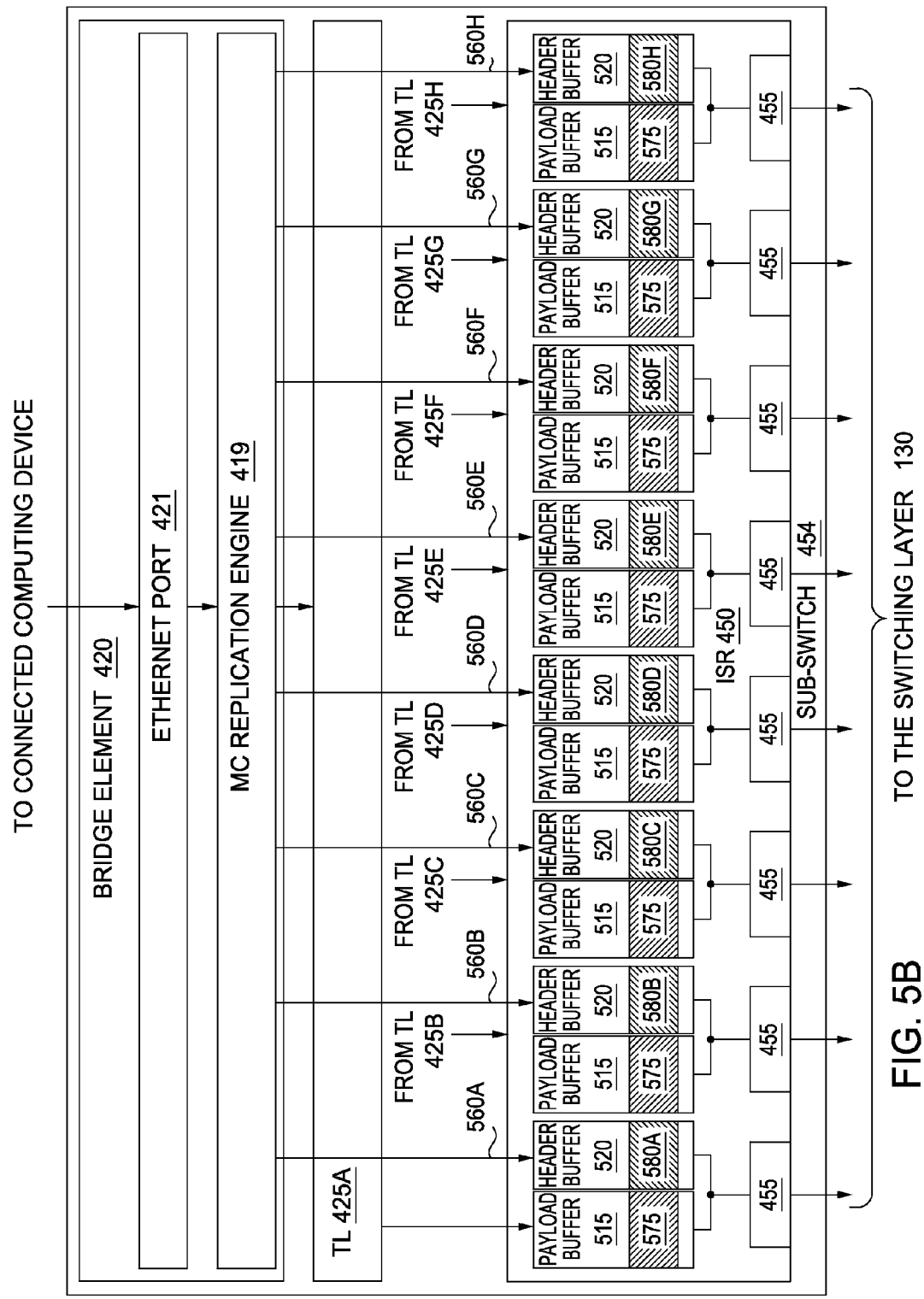

FIGS. 5A-5B illustrate performing bandwidth multiplication in the sub-switch of FIG. 4, according to embodiments of the disclosure. In FIG. 5A, the data path 510 illustrates the path taken by a payload of a received multicast data frame. For the sake of clarity, all other bridge elements, PCIe ports, and TLs have been omitted from the figure. The Ethernet port 421 receives from a computing device (e.g., server 105) connected to the distributed switch 180 a multicast data frame which may contain a multicast group ID. The MC replication engine 419 uses the group ID to determine how many copies of the payload are required. As shown, the MC replication engine 419, in a single transfer, places eight copies of the payload into eight payload buffers 515 in the ISR 450. For example, the sub-switch 454 has a bus that enables the MC replication engine 419 to make one copy of the payload of the multicast data frame which is simultaneously copied into eight payload buffers 515. Note that the sub-switch 454 has the ability for a single bridge element to use buffers that are associated with other bridge elements 420 or PCIe ports 422. Thus, a bus controller (e.g., hardware or firmware) on the sub-switch 454 may block the other TLs (TL 425B-H) from accessing the bus and permit TL 425A to use the shared bus to copy the payload into each of the payload buffers 515 simultaneously. Of course, this may be performed sequentially if desired. Moreover, the controller or TL 425A may determine which buffer is accessed by the bus. For example, the controller may permit TL 425A to copy the payload into only a subset of the buffers instead of all of them.

FIG. 5B illustrates the MC replication engine 419 creating a header for the copies of the different payloads. Data paths 560A-H illustrate that the MC replication engine 419 creates eight unique headers 580A-H for each of the payload copies 575 stored in the payload buffers 515. The headers 580A-H, in general, provide the routing information necessary for the payloads to end up at the destinations specified in the multicast group membership table. The ISR 450 may combine a header 580A-H with a payload copy 515 to create a cell which is then forwarded in the switching layer 130. In one embodiment, the MC replication engine 419 transmits the headers 580A-H to the respective header buffers 520 one at a time. That is, the MC replication engine 419 transfers the payload only once but each header may be created individually. Because each cell is sent to a different destination as defined by the MC group membership, the customized headers 580A-H of the cells contain different destination data.

Although the payload and header buffers 515, 520 are shown as separate memory units, in one embodiment, they may be different logical partitions of the same memory unit.

Copying the payload into the eight buffers of the ISR 450 multiplies the bandwidth by eight. That is, instead of using only one of the connection interfaces 455 to forward a multicast data frame to all the different destinations of the multicast group, the sub-switch 454 can use up to eight interfaces 455 that transfer the data frames in parallel, according to one embodiment. Moreover, assuming the Ethernet port 421 and connection interfaces 455 have the same bandwidth (e.g., 100 gb/s), the sub-switch may forward the data frames at approximately eight times the bandwidth it was received. Of course, a sub-switch with more (or less) connection interfaces will change the possible bandwidth multiplication accordingly. Furthermore, the sub-switch 545 may be configured to use less than the total number of connection interfaces 455. Thus, a bandwidth multiplication of eight is the maximum, but in other embodiments, the sub-switch 454 may use less than eight of the connection interfaces 455 for forwarding a multicast data frame.

Figure 6:
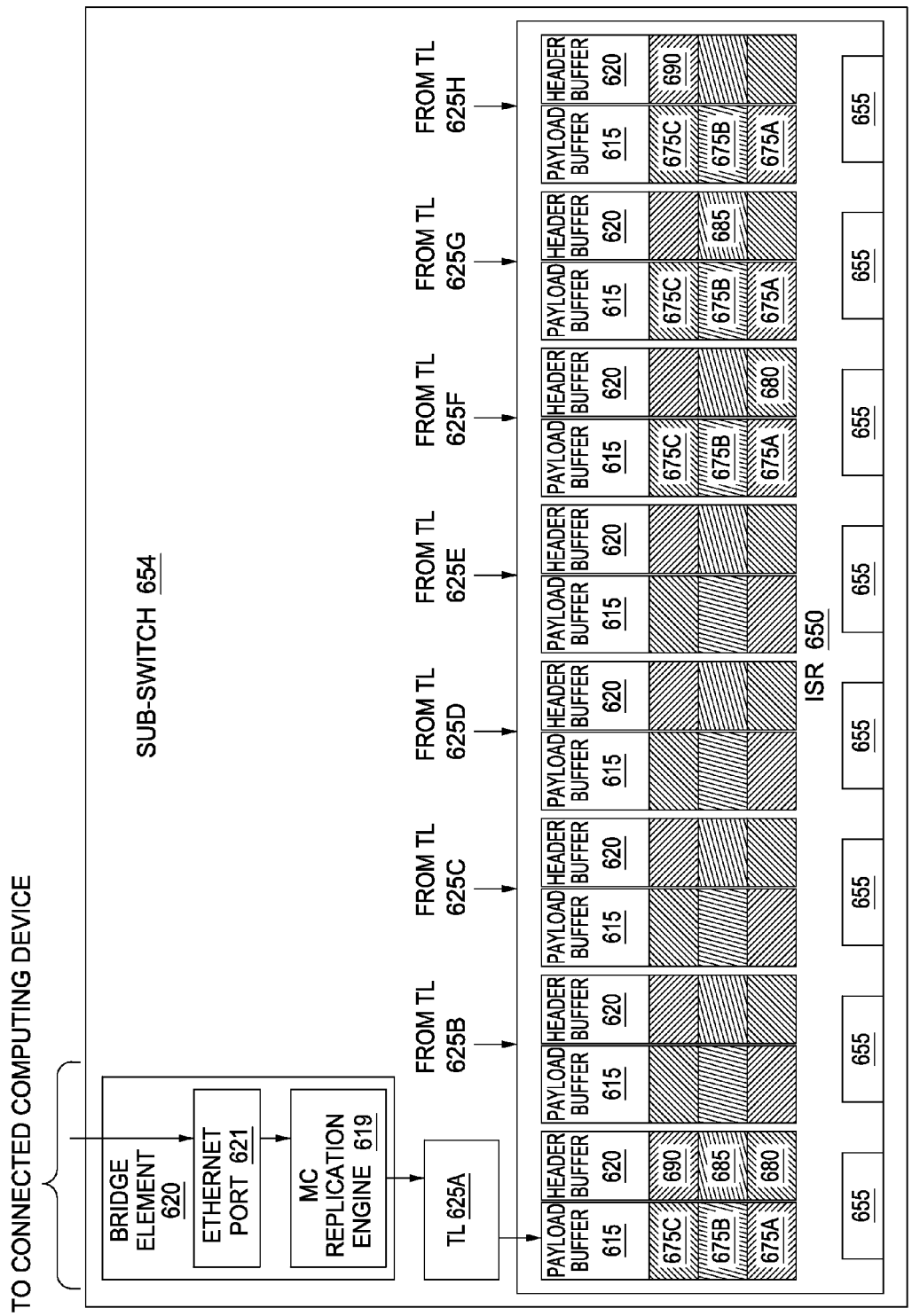
FIG. 6 illustrates performing bandwidth multiplication in the sub-switch of FIG. 4 using chunks of an Ethernet frame, according to one embodiment described herein.

FIG. 6 illustrates performing bandwidth multiplication in the sub-switch of FIG. 4 using chunks of a data frame, according to one embodiment of the disclosure. Instead of copying the entire payload of a received multicast data frame into the payload buffers, the MC replication engine 619 may separate the payload into different chunks. Using the process described in FIG. 5A, the TL 625A may "snapshot" eight copies of a single chunk 675 into each of the payload buffers 615. This process is repeated for each chunk 675 of the payload until all the chunks of the payload 675A-C are loaded into the payload buffers 615. As shown here, the TL 625A separates the received payload into three chunks—payload chunks 675A-C. Thus, in three transfers, each of the payload buffers 615 contain three payload chunks 675A-C that correspond to the entire payload of the received data frame.

The MC replication engine 619 creates different headers for each of the payload chunks 675A-C. Accordingly, in one embodiment, the chunks 675A-C may use different paths through the switching layer 130 to reach the same destination. However, once the different chunks 675 arrive at the same ultimate destination, the headers 680, 685, and 690 may contain sequence numbers so that the TL associated with the destination may reassemble the chunks to form the payload. Breaking up the received payload into chunks and using separate data paths for each chunk, may improve data throughput in the distributed switch 180.

FIG. 6 illustrates two different embodiments of storing the payload chunks 675 and headers 680, 685, 690 in the ISR 650. For these two embodiments, it is assumed that the payload chunks 675A-C are a chunk of the same data frame and are transmitted to the same destination. For the payload and header buffers 615, 620 associated with TL 625A, the MC replication engine 619 stores the headers 680, 685, 690 such that the payload chunks associated with the same address is transmitted by the same connection interface 655. If the distributed switch is organized according the pattern shown in FIG. 3—i.e., each sub-switch 254 is connected to every other sub-switch 254—then the payload chunks 675A-C travel the same path to reach the destination sub-switch.

Conversely, the MC replication engine 619 may store the headers such that payload chunks 675 intended for the same destination are transmitted from different connection interfaces 655. For example, the MC replication engine 619 may store header 680 associated with chunk 675A in the header buffer 620 associated with TL 625F but store header 685 associated with chunk 675A in the header buffer 620 associated with TL 625G. Accordingly, both payload chunk 675A and 675B would end up at the same destination but could be transmitted using different connection interfaces 655, and thus, different communication paths to the destination sub-switch. Further, assuming the ISR 650 can transfer the payload chunks 675 in any order they are received, payload chunks 675A-C may be transmitted simultaneously via the connection interfaces 655 associated with TLs 625F-H. This may be advantageous when compared to transmitting the payload chunks 675 sequentially through the same connection interface 655.

Figure 7:
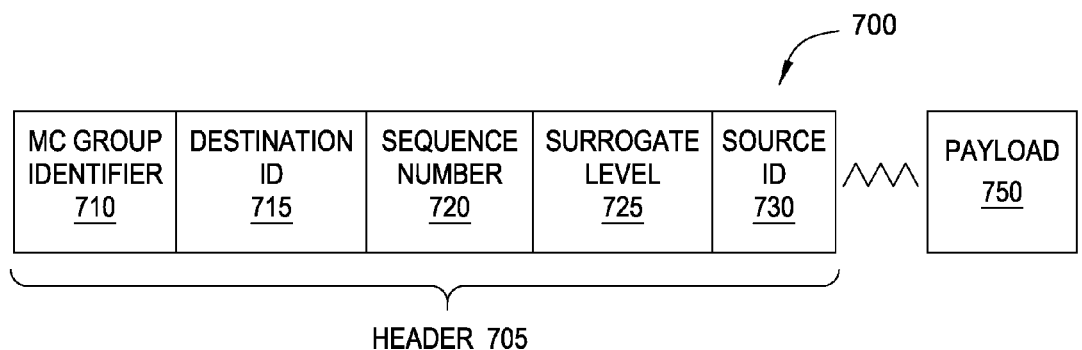
FIG. 7 illustrates a cell transmitted on the switch layer, according to one embodiment described herein.

FIG. 7 illustrates a cell transmitted on the switch layer, according to one embodiment of the disclosure. The cell 700 includes a header portion 705 and a payload 750. The payload 750 may be, for example, any portion of a multicast data frame such as a portion of the payload (or the entire payload) of an Ethernet frame. The header 705 includes a MC group identifier 710, destination ID 715, sequence number 720, surrogate level 725, and source ID 730. The header 705 is not limited to the portions shown but may include more or less data.

The MC group identifier 710 may be the same group identifier that was included in the received multicast data frame or is associated with the group identifier in the data frame. For example, the group identifier in the multicast data frame may be used as an index into a local table to determine the MC group identifier 710. As the cell 700 is forwarded in the distributed switch 180, the receiving sub-switch is able to identify the group members using the MC group identifier 710.

The destination ID 715 is used to route the cell 700 through the distributed switch 180. The destination ID 715 may include, for example, a sub-switch ID, bridge element number, port number, logical port number, etc. The MC replication engine may place some or all of this routing information in the destination ID portion 715.

The sequence number 720 is used if the payload of the multicast data frame was separated in chunks as described in FIG. 6. Once the cell 700 arrives at the destination, the designated TL may use the sequence numbers 720 to recombine the payloads 750 to generate the original payload of the received data frame. Thus, in embodiments where the original payload is not separated, the sequence number 720 may be omitted.

The surrogate level 725 is used when multicast copies are transmitted to intermediate (i.e., surrogate) sub-switches if the receiving sub-switch does not have enough connection interfaces to transfer the multicast copies to all the members of a MC group. In general, the distributed switch 180 may use a hierarchy of surrogates to propagate a multicast data frame to all the members. The surrogate level 725 instructs the receiving sub-switch what level it is in the hierarchy. This will be discussed in greater detail below.

The source ID 730, like the destination ID 715, may include a sub-switch ID, bridge element number, port number, logical port number, etc. In one embodiment, the source ID 730 may be used to ensure that the multicast copies are not transmitted to the same sub-switch that is currently transmitting the cells 700. This may prevent looping.

Figure 8:
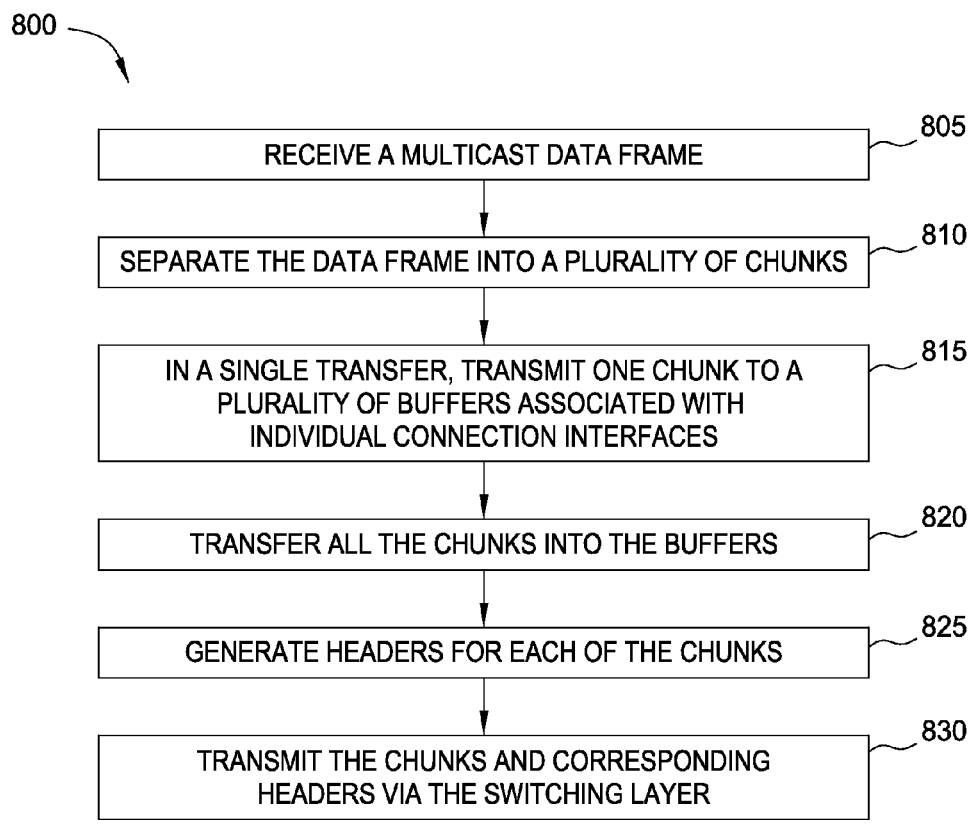
FIG. 8 is a technique of bandwidth multiplication, according to one embodiment described herein.

FIG. 8 is a technique 800 of bandwidth multiplication, according to one embodiment of the disclosure. At step 805, a bridge element on a sub-switch receives a multicast data frame from a connected computing device (e.g., a server 105). The communication protocol may be an Ethernet, IP, Infiniband, or any other communication protocol that has multicast/broadcast (i.e., one-to-many) capabilities. Note that InfiniBand is a registered trademark of the InfiniBand Trade Association.

In one embodiment, at step 810, a MC multicast engine in the bridge element may separate the payload of a data frame into different chunks, however, this is not a requirement.

At step 815, by borrowing TLs and buffer resources assigned to other bridge elements or different communication protocols (i.e., PCIe), the TL associated with the bridge element that received the multicast data frame may use a bus to snapshot a copy of one of the chunks of the payload into a plurality of payload buffers in a single transfer. As shown in FIGS. 5-6, in one transfer, eight copies are loaded in the payload buffers simultaneously. At step 820, the TL may in subsequent transfers transmit the rest of the chunks into the payload buffers. In FIG. 6, for example, the TL 625A uses three transfers to store chunks 675A-C into the payload buffers 615.

At step 825, the MC replication engine generates the headers for each of the transferred chunks. For example, the headers for the chunks that are going to the same destination may be identical except for the sequence number that informs the receiving bridge element of the ordering of the chunks. In one embodiment, the TL using individual transfers to place the customized headers into the borrowed header buffers. Note that the headers may be stored in the header buffers before, during, or after the TL snapshots the payload chunks into the payload buffers. For example, the number of chunks of a frame's payload may exceed the size of the payload buffers, thus, the MC replication engine may transfer the chunks into the payload buffers until they are full, generate the customized headers, and allow the ISR to transmit the combined cells before again storing the rest of the payload chunks in the payload buffers and generating additional headers.

At step 830, the ISR combines a payload chunk from the payload buffer with its corresponding header from the header buffer and forwards the resulting cell according to the destination ID. Once all the different chunks are received at the destination TL, it may reconstruct the multicast data frame from the plurality of received cells and forward the entire payload of the multicast data frame to a computing device connected to the distributed switch 180.

In one embodiment, the ISR may not immediately evict the chunks that have been forwarded to the switching layer. For example, a controller on the sub-switch may detect that one of the connection interfaces is being used to transfer high priority data, and thus, cannot be borrowed by the bridge element that received the multicast data frame. In that case, the controller may limit which payload buffers receive the data chunks via a shared bus. For example, the sub-switch may need to send a copy of the multicast data frame to eight MC members but only has seven connection interfaces available. After sending the frame to the seven members in parallel using the seven interfaces, instead of again transferring the chunks to a payload buffer, the MC replication engine may generate one or more replacement headers that supplant the original headers for one or more of the chunks. Specifically, these replacement headers include a different destination from the destination found in the original headers. The chunks and the replacement headers may then be combined to form a new cell which is forwarded to the final (i.e., the eighth) destination. Thus, by not immediately evicting forwarded chunks, the sub-switch may avoid re-transferring data chunks from the TL to the payload buffers.

A Hierarchy of Surrogates

The bandwidth multiplication discussed in the previous section may be expanded and advantageously used to continue to increase the bandwidth for MC groups that exceed the number of connection interfaces on the sub-switch. That is, if the sub-switch 454 of FIG. 4 needs to send copies of the multicast data frame to more MC group members than it has connection interfaces, the sub-switch is still limited to the combined bandwidth of the connection interfaces 455 (e.g., 8×100 gb/s) to transfer the payload of the data frame. However, using a hierarchy of surrogate sub-switches (or surrogate bridge elements) permits the distributed switch to continue to scale the bandwidth as the members in the MC group increase. That is, if the receiving port is 100 gb/s and the multicast data frame must be sent to 30 destinations, the distributed switch can use a combined bandwidth of approximately 30×100 gb/s to transfer the copies of the multicast data frame.

Figure 9:
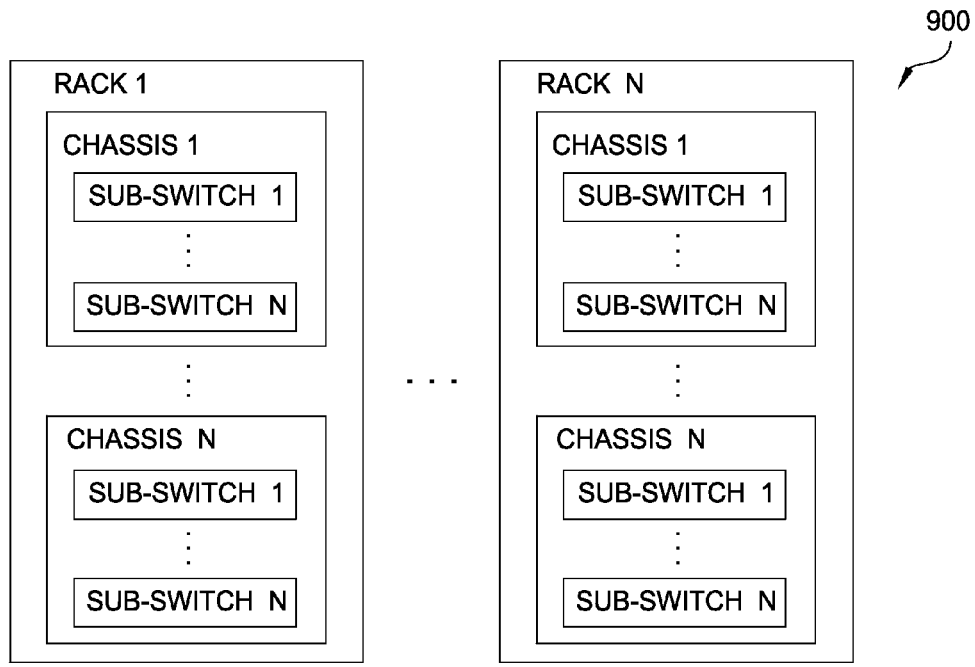
FIG. 9 is a computing system that is interconnected using the distributed switch, according to one embodiment described herein.

FIG. 9 is a computing system that is interconnected using the distributed switch, according to one embodiment of the invention. The computing system 900 includes one or more racks (Racks 1-N) that each contain one or more chassis (Chassis 1-N). To facilitate the communication between the different computing devices that may be contained in the chassis 1-N, the computing system 900 may use a plurality of sub-switches 1-N. Specifically, the distributed switch 180 shown in FIGS. 1-2 may be used to interconnect a plurality of different computing devices in the system 900. For clarity, only the sub-switches (i.e., the microchips that contain the bridge elements as shown in FIG. 4) are illustrated. In one embodiment, each of the sub-switches is connected to each of the other sub-switches. That is, each of the sub-switches has at least one wire directly connecting it to every other sub-switch, even if that sub-switch is on a different rack. Nonetheless, this design is not necessary to perform the embodiments disclosed herein.

Figure 10:
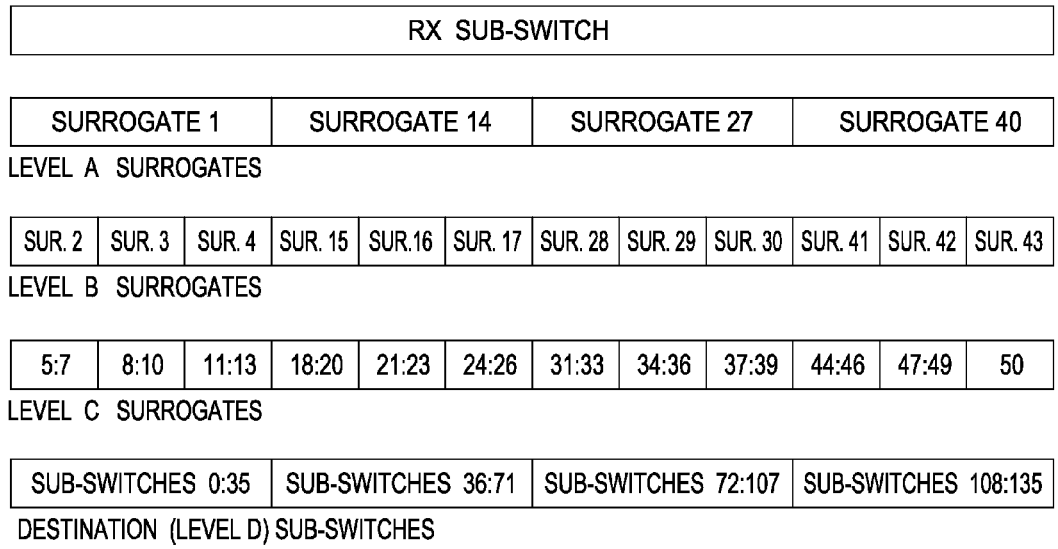
FIG. 10 is a hierarchy of surrogates for forwarding multicast data frames, according to one embodiment described herein.

FIG. 10 is a hierarchy of surrogates for forwarding multicast data frames, according to one embodiment of the invention. To continue to scale bandwidth as group membership increases, the computer system 900 may establish a hierarchy. As shown, the hierarchy 1000 is established for a distributed switch that has 136 different sub-switches where each sub-switch has eight connection interfaces (e.g., the sub-switch 454 shown in FIG. 4). The hierarchy 1000 is divided into four levels (excluding the Rx sub-switch that received the multicast data frame). All the sub-switches in the distributed switch may be divided into four groups. However, the levels of the hierarchy 1000 and the number of number of groups is arbitrary and may be dependent upon, for example, the total number of sub-switches, number of ports/connection interfaces on the sub-switches, and the architecture of the sub-switches. For example, a distributed switch with only 20 sub-switches may need a hierarchy with only one level of surrogates. Conversely, if each sub-switch has 135 ports with which it could forward the packet in parallel, then the hierarchy may not be needed. Instead, the sub-switches could increase the bandwidth used to transmit the multicast data by simply using the necessary number of ports to forward a multicast data frame up to 135 sub-switches in parallel. Using the hierarchy 1000, however, may reduce costs by allowing the distributed switch to accommodate greater number of sub-switches as well as increase bandwidth without having to use sub-switches with more ports.

The hierarchy 1000 is illustrated such that sub-switches are assigned to a plurality of surrogates. The Level A surrogates—i.e., the top-level of the hierarchy 1000—has four chosen surrogate sub-switches, or more specifically, four surrogate bridge elements that may or may not be located on different sub-switches. Each of the Level A surrogates are assigned a group of the sub-switches. This group is defined by the sub-switches that are directly below the box containing the Level A surrogate in FIG. 10. That is, Level A surrogate 1 is assigned to sub-switches 0:35, surrogate 14 is assigned to sub-switches 36:71, and so on. Accordingly, when the receiving sub-switch (i.e., RX sub-switch) receives a multicast data frame, it uses a MC group table that identifies the members of the MC group. From this information, the RX sub-switch identifies which of the sub-switches 0:135 need to receive the data frame. If the membership includes a sub-switch in the group 0:35, the RX sub-switch forwards the data frame to surrogate 1. If none of the sub-switches in 0:35 are in the MC group's membership, then the RX sub-switch does not forward the data frame to surrogate 1.

Assuming that at least one of the sub-switches 0:35 is a member of the MC group, a similar analysis may be performed when the packet is received at surrogate 1. The surrogate 1 sub-switch looks up the group membership and determines which one of the Level B surrogates should receive the packet. The Level B surrogates 2-4 are assigned to a subset of the sub-switches assigned to Level A surrogate 1. That is, the surrogate 2 sub-switch is assigned to sub-switches 0:11, surrogate 3 is assigned to sub-switches 12:23, and surrogate 4 is assigned to sub-switches 14:35. If the group membership includes sub-switches in each of these three groups, then surrogate 1 forwards a copy of the packet to surrogates 2-4.

The Level B surrogates also consult the hierarchy 1000 and the group membership to determine which of the Level C surrogates should receive the packet. Although not shown explicitly, surrogate 5 is assigned to sub-switches 0:3, surrogate 6 is assigned to sub-switches 4:7, and so on. Thus, if sub-switch 1 is a member of the MC group, then Level C surrogate 5 would receive the packet and forward it to sub-switch 1.

In one embodiment, the surrogate sub-switches are chosen from among the possible destination sub-switches (i.e., Level D of the hierarchy). That is, the surrogate sub-switches may be one of the sub-switches 0:135. Further still, the surrogates may be selected from the group of sub-switches to which it is assigned. For example, surrogate 1 may be one of sub-switches in 0:35 while surrogate 5 may be one of the sub-switches in group 0:3, and so on. In another embodiment, however, the surrogates may be selected from sub-switches that are not in the group of sub-switches assigned to the surrogate.

Alternatively, the surrogates sub-switches may not be destination sub-switches. For example, the distributed switch may include sub-switches whose role is to solely serve as a surrogate for forwarding multicast traffic. Or, bridge elements or PCIe ports of the sub-switch that are not connected to any computing device—i.e., an ultimate destination of a multicast data frame—may be chosen as surrogates. Thus, even though one or more of the bridge elements on a sub-switch may be connected to a computing device, an unconnected bridge element on the sub-switch may be selected as a surrogate. Choosing surrogates sub-switches and surrogate bride elements/TLs within the sub-switch will be discussed in more detail later.

Figure 11:
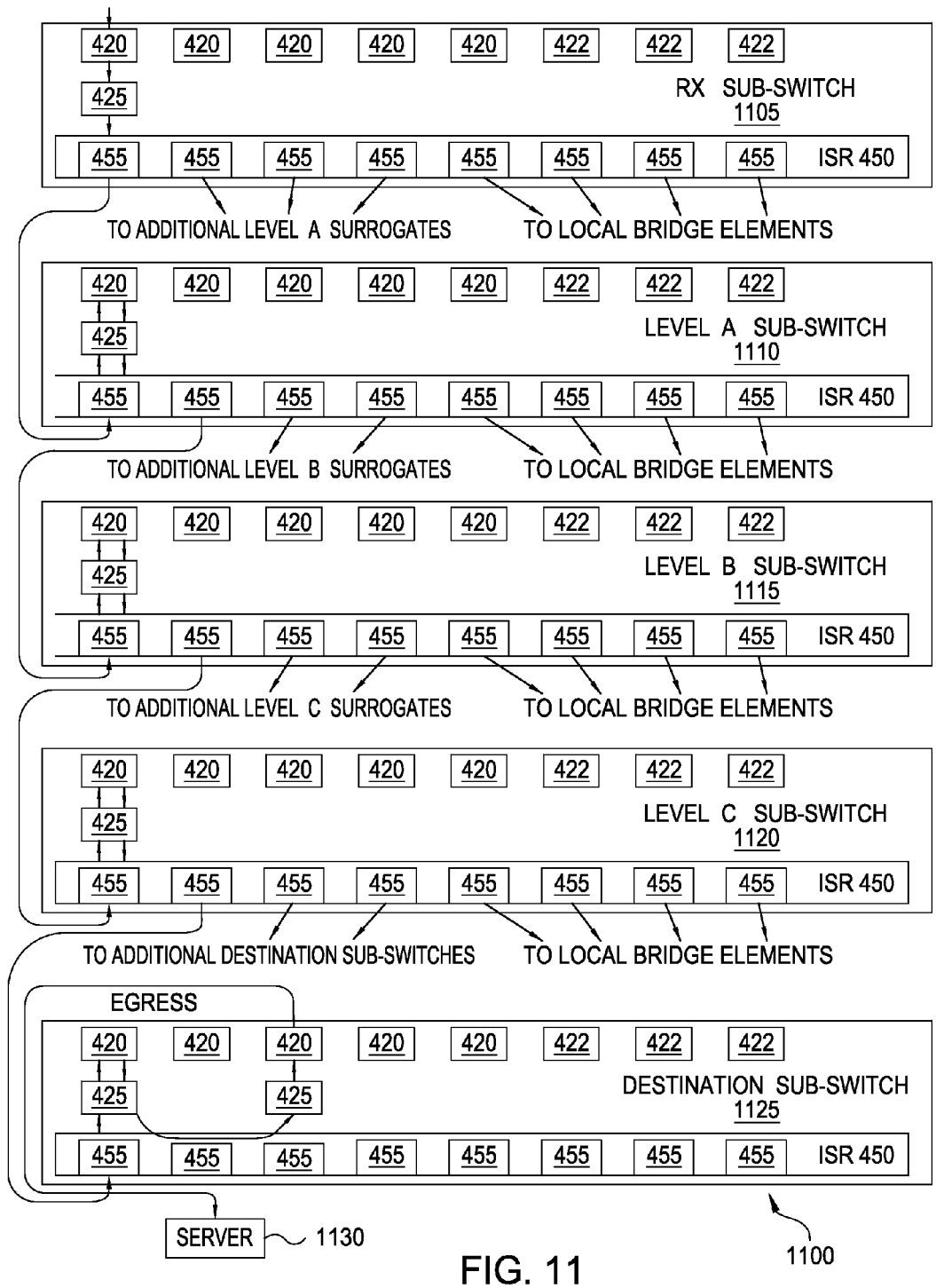
FIG. 11 is a system diagram of a portion of the hierarchy illustrated in FIG. 10, according to one embodiment described herein.

FIG. 11 is a system diagram of a portion of the hierarchy illustrated in FIG. 10, according to one embodiment of the invention. The partial hierarchy 1100 shows one sub-switch from each of the four levels of hierarchy 1000 of FIG. 10. Each of the sub-switches may be similar to the sub-switches disclosed in FIGS. 4-6. As shown, the RX sub-switch 1105 receives on an ingress port of one of the bridge elements 420 a multicast data frame. Using the process shown in FIG. 8, the TL 125 uses the ISR 450 to forward in parallel up to eight copies of the payload of the data frame in parallel, thereby achieving up to eight times bandwidth multiplication relative to the bandwidth of the ingress port (assuming the connection interfaces 455 have the same bandwidth as the ingress port). Even if the bandwidths are not the same, the Rx sub-switch 1105 achieves up to eight times bandwidth multiplication relative to a system that uses only one of the connection interfaces 455 to forward the copies of the multicast data frame instead of all eight in parallel.

Each of the sub-switches 1105, 1110, 1115, and 1120 are configured such that three or four of the connection interfaces 455 forward the payload of the data frame to a surrogate sub-switch while another four are reserved for forwarding the payload to bridge elements located on the sub-switch—i.e., local bridge elements. Using Rx sub-switch 1105 as an example, the right-most four connection interfaces 455 (and the associated payload and header buffers) are dedicated to the four right-most bridge elements 420 on the sub-switch 1105. Thus, if one of the four right-most bridge elements 420 is connected to a computing device that is a destination of the multicast data frame, then one of the right-most connection interfaces 455 is used to transfer the payload to the corresponding bridge element 120. This may be performed by a routing mechanism in the ISR 450 such as a crossbar switch. Thus, the ISR 450 may have the capability to route data between source and destination bridge elements that are on the same sub-switch without using a connecting interface 455 connected to another sub-switch. However, if the other four local bridge elements 420 of the Rx sub-switch 1105 are not connected to computing devices that are members of the MC group, then the four right-most connection interfaces 455 would not be used.

Rx sub-switch 1105 uses the four left-most connection interfaces 455 to forward the payload of the multicast data frame to up to four Level A surrogates. For brevity, only one of the Level A surrogates (i.e., sub-switch 1110) is shown. To forward the copy of the data frame, the MC replication engine would use the group ID, which may be derived from portions of the multicast data frame and the receiving port's configuration on the sub-switch, to identify the group membership which it then uses to determine which of the Level A surrogates needs a copy of the payload of the data frame. Using one of the connection interfaces 455, the ISR 450 of sub-switch 1105 transfers a cell containing the payload to the Level A sub-switch 1110.

One of ordinary skill in the art will recognize that the number of connection interfaces 455 (and their associated resources) used for surrogate and local bridge element communication is configurable. For example, two connection interfaces may be used to communication with the four local bridge elements which leaves six connection interfaces reserved to communication with surrogate or destination sub-switches. Conversely, only two of the connection interfaces 455 may be used to communicate with surrogates while six are reserved for local bridge elements. This configuration may be preferred if there are seven bridge elements 420 on a sub-switch rather than five so that each of the local bridge elements 420 has a corresponding connection interface 455.

Further, this may affect the hierarchy 1000 since the number of surrogates at each level has decreased.

Using the method shown in FIG. 8, Level A sub-switch 1110 receives the cell, a TL 425 copies the payload into the eight header buffers in the ISR 450, and the MC replication engine in the receiving bridge element 420 generates headers for each of the different chunks of the payload. That is, the Level A sub-switch 1110 performs a very similar process that what was performed by the Rx sub-switch 1105 to achieve further bandwidth multiplication—i.e., the cell transferred on the connection between sub-switch 1105 and 1110 is reproduced and transmitted on up to an additional seven connections. Note that in FIG. 11 the connection interface 455 used to receive the cell is not also used to transmit cells to a surrogate sub-switch or a local bridge element 420. However, this is not a requirement. In one embodiment, the connection interface 455 receiving the cell may also be used to forward the cell, but this connection may be slower compared to the other seven interfaces 455 since it may compete for resources that are being used to store and manage additionally received cells that contain different chunks of the data frame's payload.

In one embodiment, the receiving sub-switch may be informed of which level it is in the hierarchy. That is, because a sub-switch may be, for example, both a Level A and Level C surrogate, when a sub-switch forwards a cell to a surrogate, it may include the surrogate level in the header of the cell. As shown in FIG. 7, the header 705 includes a surrogate level 725 portion. In this case, the MC replication engine in Rx sub-switch 1105 may place in the surrogate level 725 that the sub-switch 1110 is being used as a Level A surrogate. Of course, the sub-switches may use a different method besides putting the surrogate level information in the header. For example, Rx sub-switch 1105 may send a special packet that includes the level information. Alternatively, the sub-switch 1110 may query a master controller or database using a packet ID, for example, to determine the surrogate level.

With the surrogate information, a MC replication engine in sub-switch 1110 determines which Level B surrogates should receive the cell by consulting the hierarchy structure 1000 in FIG. 10. Furthermore, the MC replication engine may determine if any of the destinations of the multicast data frame are connected to the bridge elements 420 located on the sub-switch 1110. If so, cells are forwarded to those bridge elements 420 using the four connection interfaces 455 dedicated for local bridge elements 420.

As shown, at least one Level B surrogate (i.e., sub-switch 1115) is forwarded the payload of the data frame. Accordingly, the MC replication engine generates a new header for the payload chunks and forwards one or more resulting packets to sub-switch 1115.

Like sub-switches 1105 and 1110, sub-switch 1115 may use the method in FIG. 8 to achieve up to eight times the bandwidth multiplication. As shown, the Level B sub-switch 1115, receives the data packet from sub-switch 1110, uses a group ID number to identify the MC group membership, and based on the group membership, uses the hierarchy information 1000 to transmit a copy of the payload of the multicast data frame to the Level C sub-switch 1120.

The Level C sub-switch 1120 may also perform bandwidth multiplication as described above. In the hierarchy 1100 shown, a multicast data frame passes through at most three surrogates before reaching the destination sub-switch 1125. Of course, if the destination computing device is connected to one of the local bridge elements 420 of the surrogate sub-switches 1110, 1115, or 1120, than the packet is delivered to the local bridge element 420 using one of the connection interfaces 455 dedicated to local multicast traffic. If not, as shown in FIG. 11, the payload of the multicast data frame is routed via subsequent cells through all three layers of surrogates until it reaches the destination sub-switch 1125.

The Level C sub-switch 1120 may route the cell to the connection interface 455 of the destination (i.e., Level D) sub-switch 1125 that is associated with the bridge element 420 that is directly connect to the destination computing device—i.e., server 1130. Specifically, the destination sub-switch 1125 receives the cell or cells on a surrogate bridge element. As shown here, this is the right-most bridge element. However, if this bridge element is not connected to the destination computing device, then it routes the cells using the ISR 450 to the correct bridge element. For example, to save memory, the Level C sub-switch 1120 may not know which local ports of the destination sub-switch 1125 are connected to the destination computing device. Instead, it only knows the location of the surrogate bridge element, which, when it receives the cells, transfers the data to the correct local bridge element (i.e., the bridge element third from the left). The TL 425 may then translate one or more of the received cells back into a single frame (e.g., an Ethernet frame) that has the same payload as the multicast data frame that was received at the Rx sub-switch 1105. Finally, the bridge element 420 directly connected to the destination computing device transmits the data frame to the destination computing device—e.g., server 1130—using its egress port.

In this manner, the bandwidth used to transfer the payload of the multicast data frame through the distributed switch may be increased based on the number of members in the MC group. Note that the ability of the hierarchy to increase bandwidth as the number of members in the MC group increase might not be limited by the number of surrogates. For example, for the bandwidth to increase directly as the membership grows, the hierarchy must have a sufficient number of surrogate sub-switches and/or surrogate levels. If the total number of surrogates is limited or too few levels of hierarchy are used, the bandwidth may still scale as the group membership grows but the resulting bandwidth might be less than a system that has the requisite number of surrogates—i.e., the bandwidth may be capped. This will be discussed in more detail in the next section.

Figure 12:
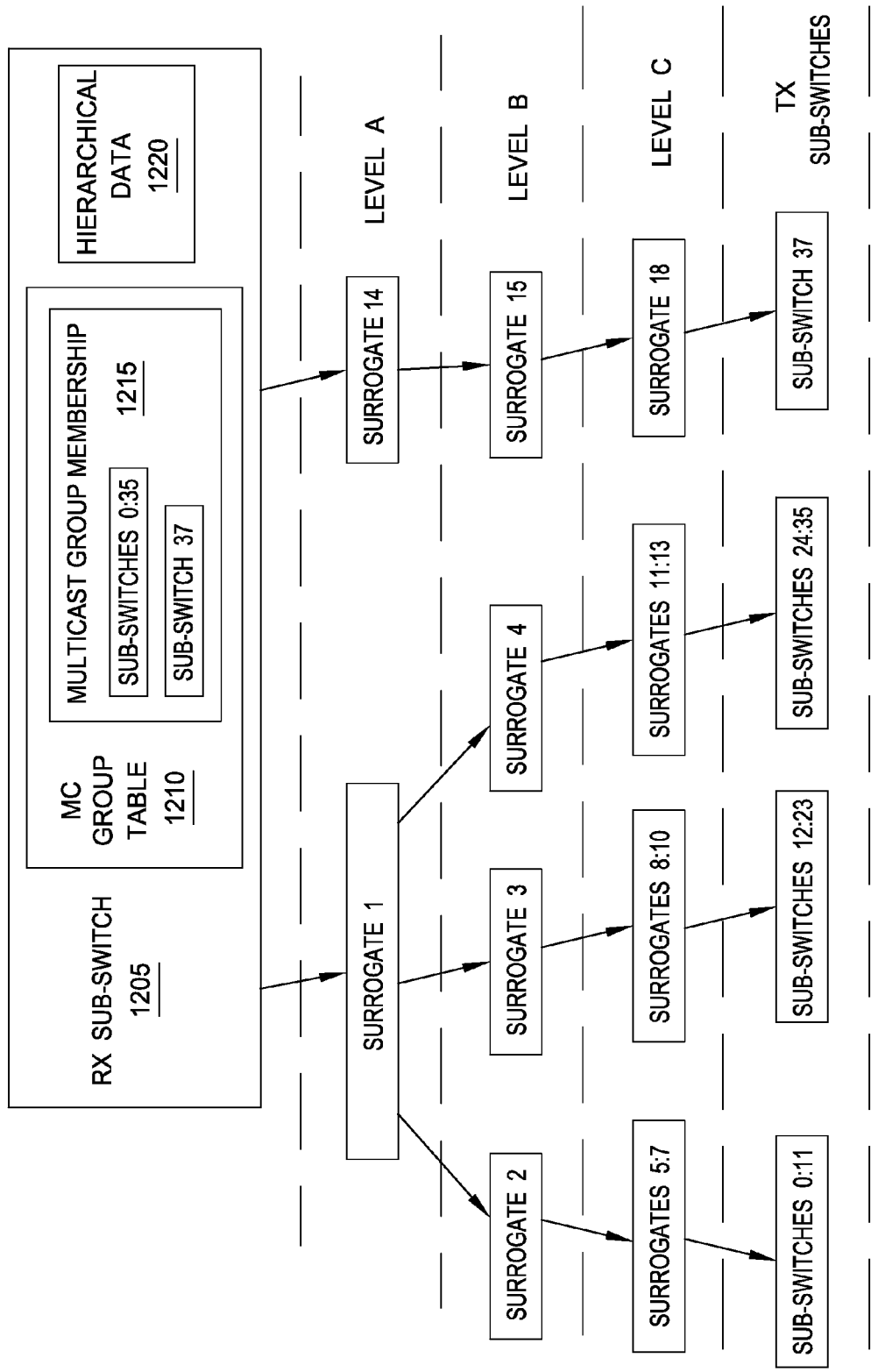
FIG. 12 illustrates an example path of a multicast data frame in the hierarchy illustrated in FIG. 10, according to one embodiment described herein.

FIG. 12 illustrates an example path of a multicast data frame in the hierarchy illustrated in FIG. 10, according to one embodiment of the invention. When the Rx sub-switch 1205 receives a multicast data frame, the receiving bride element uses a MC group ID to search for a corresponding MC group membership 1215 in a MC group table 1210. The table 1210 may be located in memory of the Rx sub-switch or elsewhere in the distributed switch.

For the particular multicast data frame received here, the MC group membership 1215 includes sub-switches 0:35 as well as sub-switch 37. The Rx sub-switch 1205 is responsible for ensuring that each of the sub-switches in the MC group membership 1215 receives a copy of the payload of the received multicast data frame. Alternatively, instead of listing destination switches in the tables 1210, the MC group membership 1215 may list different computing devices that are to receive a copy of the data frame, or the header of the received multicast data frame may contain a list of the destination computing devices (e.g., a list of IP or MAC addresses). In these cases, the hierarchical data 1220 may contain a look-up table that informs the sub-switch 1205 which sub-switches are connected to the destination computing devices. Using this information, the sub-switch may then identify the correct destination sub-switch.

Additionally, the Rx sub-switch 1205 may use the hierarchical data 1220 to determine which surrogates should receive a copy, or, if the destination computing devices are all attached to the Rx sub-switch 1205, which local bridge elements should receive a copy of the payload of the multicast data frame. Using the hierarchy 1000 illustrated in FIG. 10, sub-switches 0:35 are assigned to Level A surrogate 1, while sub-switch 37 is assigned to Level A surrogate 14. Accordingly, using at least two connection interfaces, the Rx sub-switch 1205 forwards a cell to the two surrogates identified in the hierarchical data 1220.

In one embodiment, the hierarchy may be specifically tailored for each sub-switch. That is, the Level A surrogates for one sub-switch may be different than the Level A surrogates for another sub-switch. This distributes the responsibility of forwarding packets among the different sub-switches. For example, the distributed switch may choose surrogates according to predefined rules such as a sub-switch can be only assigned as a surrogate for a maximum number of sub-switches, or a surrogate cannot be a Level A and B surrogate for the same sub-switch (to prevent looping). Based on the rules, the distributed switch may provide a customized hierarchy for each sub-switch or a group of sub-switches. In a distributed switch that uses customized hierarchies, the header may contain information, such as surrogate level and source ID, which enables each surrogate sub-switch to determine which of the hierarchies to use in order to forward the packet.

Once the Level A surrogates receive the packet, using the hierarchical data (which may be stored locally), they determine which Level B surrogates must receive the packet in order for payload of the multicast data frame to reach all of the destination listed in the MC group membership 1215. In this case, surrogate sub-switch 1 forwards the packet to surrogates 2, 3, and 4 using the three connection interfaces that are dedicated to transferring packets to other surrogate levels. Conversely, surrogate 14 forwards the packet to only one of its three Level B surrogates—i.e., surrogate 15. As mentioned previously, in one embodiment the surrogate sub-switches may contain local bridge elements that are connected to the destination computing devices. For example, surrogate 14 may in fact be sub-switch 37. In that case, once surrogate 14 received the packet it would use one of its connection interfaces to forward the packet to a local bridge element which would then transmit the packet to the destination computing device. Thus, the rest of the hierarchy would not need to be traversed.

However, in other embodiments, the distributed switch may comprise of dedicated surrogate sub-switches and/or bridge elements. That is, a bridge element may be dedicated for being a surrogate to receive forwarded and packets and then distribute copies of these packets to the internal connection interfaces. Moreover, the dedicated bridge element (or an entire sub-switch) may not be connected to any other computing devices or external networks such as a server or WAN. In this manner, the distributed switch ensures that the hardware resources of the bridge element are always available.

Assuming all the Level B surrogates receive the packets, they then forward the payload with new headers to the correct Level C surrogates. In this case, surrogate 2 may transmit in parallel packets to surrogates 5, 6, and 7, surrogate 3 transmits packets to surrogates 8, 10, and 11, and so on. Finally, the Level C surrogates transmit packets to the destination or transmitting (Tx) sub-switches, or more specifically, to the bridge element of the Tx sub-switches that has a port connected to the destination computing device that is part of the MC group membership 1215. Accordingly, surrogate 5 forwards the packet to sub-switches 0, 1, and 2, surrogate 6 forwards the packet to sub-switches 3, 4, and 5, and so on. However, if any one of the surrogates that forwarded the packets was sub-switch 0-35—i.e., a surrogate is also a destination—then Level C surrogates would not need to forward the packet to that destination. For example, if a sub-switch is assigned as to act as a surrogate for the same group of sub-switches to which it is assigned, then it may be removed from the fourth level of the hierarchy 1000 to prevent sending two packets to the same destination.

In one embodiment, a controller (e.g., an IOMC that is chosen as the master) on one of the sub-switches may be assigned to establish the one or more hierarchies. This controller may constantly monitor the fabric of the distributed switch to determine which computing devices are connected to the bridge elements of the different sub-switches. As the connections are changed, the controller may update the hierarchical data 1220 on each sub-switch. After the computing devices are attached to the different sub-switches (in any desired manner) and after the distributed switch is powered on, the controller can detect the current configuration, and generate one or more hierarchies. Moreover, if computing devices or sub-switches are removed or changed, or new ones are plugged in, the controller can dynamically detect these changes and generate new hierarchies based on the different configuration.

In one embodiment, the controller may choose the surrogates based on a performance metric. For example, the controller may use as a surrogate a bridge element on one of the sub-switches that is currently not connected to a computing device. Alternatively, the controller may monitor the network traffic flowing through the bridge elements' ports, the specific type of traffic flowing in a port, response time for forwarding receiving data packets, and the like, for the bridge elements or sub-switch. Based on this metric, the controller may choose a surrogate the bridge element that, for example, experiences the least amount of multicast traffic.

In one embodiment, before choosing a surrogate bridge element, the controller may evaluate the other bridge elements or PCIe ports on the sub-switch. As stated previously, bandwidth multiplication borrows the buffers and connection interfaces that are associated with these other hardware resources in the sub-switch. If these peer resources receive or transmit high priority network traffic, then performing the bandwidth multiplication on these sub-switches may degrade the throughput of high priority network traffic since their assigned resources are being borrowed to forward the replicated multicast packets. Accordingly, sub-switches that transport high priority network traffic, and the bridge elements on those sub-switches, may be disqualified from being selected as surrogates.

Dynamically Optimizing the Hierarchy to Provide Redundancy and Optimize Performance In addition to using the hierarchy discussed above to increase the bandwidth available in the distributed switch, the hierarchy may be dynamically changed based on optimization criteria such as recovering from a failure or reducing the data flowing between surrogates.

Figure 13:
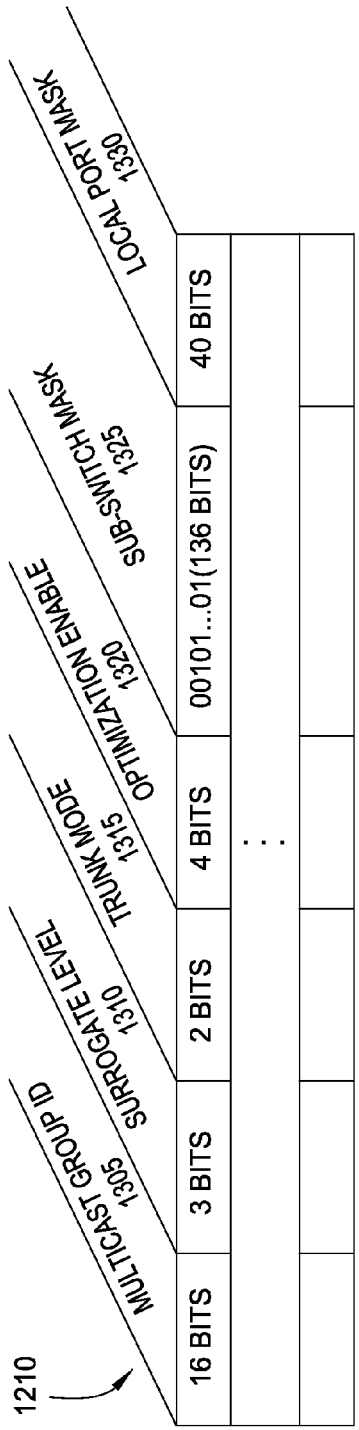
FIG. 13 illustrates a MC group table, according to one embodiment described herein.

FIG. 13 illustrates a MC group table. As shown, the MC group table 1210 includes multicast group ID 1305, surrogate level 1310, trunk mode 1315, optimization enable 1320, sub-switch mask 1325, and local port mask 1330.

A MC group ID is what a bridge element uses to index into the table 1210. For example, the bridge element may use one or more portions of a received multicast data frame to derive a MC group ID which corresponds to one of the MC group IDs 1305 stored in the MC group table 1210. Once the bridge element identifies the correct row in the table 1210, it can use the sub-switch mask 1325 to determine the sub-switches in the distributed switch that should receive the multicast data.

In one embodiment, the sub-switch mask 1325 is a bit vector where each bit corresponds to one of the sub-switches in the switch. The value of the bit (i.e., a 1 or a 0) determines whether or not the corresponding sub-switch is a destination for the multicast data. Nonetheless, the table 1210 is not limited to any particular method for specifying which sub-switches are members of the MC group. A controller (e.g., a master IOMC) may be in charge of generating and updating the sub-switch mask 1325 in each of the MC group tables 1210 as the MC group membership changes.

The local port mask 1330 specifies which local bridge element port on the sub-switch should receive a copy of the multicast data frame. In one embodiment, each sub-switch in the distributed switch is associated with its own table 1210. Further, the local port mask 1330 may contain data only for the local ports on that sub-switch. That is, the table 1210 contains only the information necessary for the sub-switch to determine which one of its local ports (i.e., a local port of one of the bridge elements) is connected to a destination computing device. To save memory, the table 1210 for a particular sub-switch may not contain the local port information 1330 for any other sub-switch in the distributed switch. However, this is not a requirement as the table 1210 may contain local port information for one or more other sub-switches in the distributed switch.

The surrogate level bits 1310 set the type of hierarchy used for each multicast group. Each type of hierarchy may vary based on the number of surrogate levels in the hierarchy. For example, the hierarchy may be a one level hierarchy, two level hierarchy, four level hierarchy, etc. Of course, as the number of sub-switches in the distributed switch increases or decreases, the different possible surrogate levels in the hierarchy may also increase or decrease.

A one level hierarchy uses only one level of surrogates to distribute the data frame to the destination sub-switches. For example, a receiving sub-switch may forward the multicast data to its four local ports and four or more surrogates. These surrogates are then responsible for sending the multicast data to the correct destination computing devices. Assuming the sub-switch contains 136 destination sub-switches, this type of hierarchy (unlike a four level hierarchy) does not ensure that bandwidth scales in a one-to-one relationship with the number of destination sub-switches. That is, a one level hierarchy still increases the available bandwidth based on the number of destination sub-switches, but it may be less than a one-to-one ratio. For example, a surrogate may have to use the same connection interface to transmit the multicast data sequentially to a plurality of different destination ports. However, the controller may set the surrogate level 1310 as to one level hierarchy if the MC group only has a few members (e.g., less than 8 sub-switches). This balances the need to increase the bandwidth by using surrogate sub-switches with the added latency that may occur from borrowing the connection interfaces on the surrogates to transmit the multicast data which may prevent other data from being transmitted.

A two level hierarchy uses two levels of surrogate sub-switches for transmitting the multicast data. For example, to achieve full bandwidth, the receiving sub-switch may transmit the multicast data to four surrogate sub-switches which each then transmit the multicast data to another four surrogates. As with a one level hierarchy, if the membership of the MC group is too large, then this hierarchy may not increase the bandwidth in a one-to-one relationship based on the number of destination sub-switches. Depending on the hierarchy and the MC group membership, the available bandwidth may scale at less than one-to-one ratio. That is, bandwidth may not increase by a multiple of the number of destination sub-switches.

In another example, to achieve half bandwidth, the receiving sub-switch may transmit the multicast data to twelve surrogate sub-switches which each then transmit the multicast data to another eleven surrogates. Thus, one of the connection interfaces of the receiving sub-switch that is assigned to forward multicast data to surrogates may have to forward the data to three different surrogates sequentially.

A four level hierarchy is shown in FIG. 10 and will not be discussed in detail here. Using a four level hierarchy ensures that even if the multicast data frame is a broadcast (i.e., the multicast data frame should be transmitted to all the sub-switches) the available bandwidth scales approximately one-to-one with the number of destination sub-switches. That is, the available bandwidth in the distributed switch is increased at rate approximate to the multiple of the number of destination sub-switches.

The trunk mode 1315 and optimization enable 1320 bits will be discussed later in this document.

After using the MC group ID to determine which type of hierarchy to use and which sub-switches should receive the multicast data frame, a receiving sub-switch may use the hierarchical data 1220 to forward the multicast data to surrogate or destination sub-switches. Moreover, the sub-switch may use the local ports mask 1330 to determine which, if any, of the local bridge elements on the receiving sub-switch should receive the packet.

Figure 14:
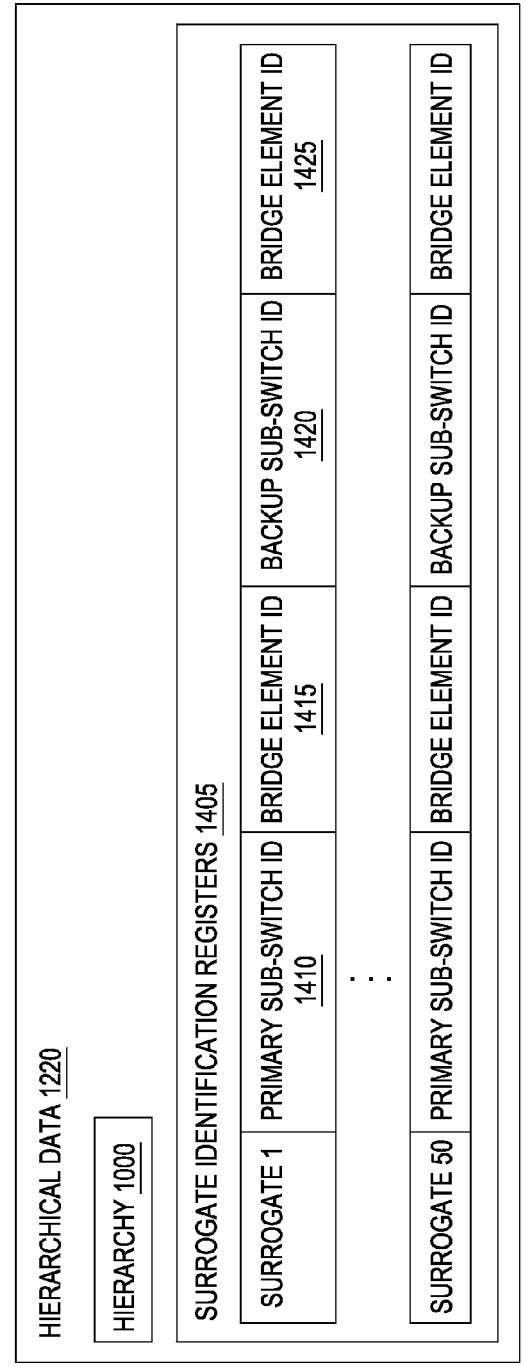
FIG. 14 illustrates hierarchical data, according to one embodiment described herein.

FIG. 14 illustrates hierarchical data 1220. The hierarchical data 1220 includes the hierarchy 1000 as shown in FIG. 10. Using the sub-switch mask 1325, the sub-switch determines which surrogates are assigned to the destination sub-switches. For example, if the receiving sub-switch is the Rx sub-switch shown in FIG. 10 and the sub-switch mask 1325 lists sub-switches 0 and 36 as MC group members, then the sub-switch will forward the multicast data to both surrogate 1 and surrogate 14.

Using the surrogate identification registers 1405, one of the MC replication engines on the receiving sub-switch determines the sub-switch ID for the different surrogates. Continuing the example above, the MC replication engine parses through the registers 1405 until it finds surrogate 1 and 14. The associated primary sub-switch ID 1410 and bridge element ID 1415 (i.e., a local bridge element on the primary sub-switch) provide the routing information that is then placed in a header to route the multicast data to surrogate 1. Thus, the controller can easily change which sub-switch is assigned to a particular surrogate in the hierarchy by changing the sub-switch ID associated with that surrogate. As shown, the registers 1405 contain an entry for each of the possible surrogates in the different hierarchy types (i.e., one level, two level, and four level hierarchies). Moreover, each surrogate may have a backup sub-switch in case the primary sub-switch fails or is removed from the system. Once the MC replications determines that the primary sub-switch is unavailable to act as the surrogate, it uses the backup sub-switch ID 1420 and bridge element ID 1425 (i.e., a local bridge element on the backup sub-switch) to route the multicast data to the backup sub-switch for that surrogate.

Once the surrogate sub-switch receives the multicast data, it can follow a similar process by identifying the destination sub-switches using its own local MC group table 1210 and determine whether to forward the multicast data to its local ports and/or to another surrogate level as dictated by the hierarchical data 1220. For example, the received multicast data may include information in its header that identifies the type of hierarchy (i.e., the number of surrogate levels) being used as well as the current surrogate level. Using this information, each surrogate may operate independently of the others. Once the controller or firmware populates the MC group tables 1210 and the hierarchical data 1220 for each sub-switch in the distributed switch, each surrogate can operate independently even during operational outages. Moreover, this architecture avoids requiring centralized hardware or firmware from having to determine routes for transmitting the different multicast cells. Instead, each surrogate sub-switch has the necessary information to route the multicast data.

Figure 15A:
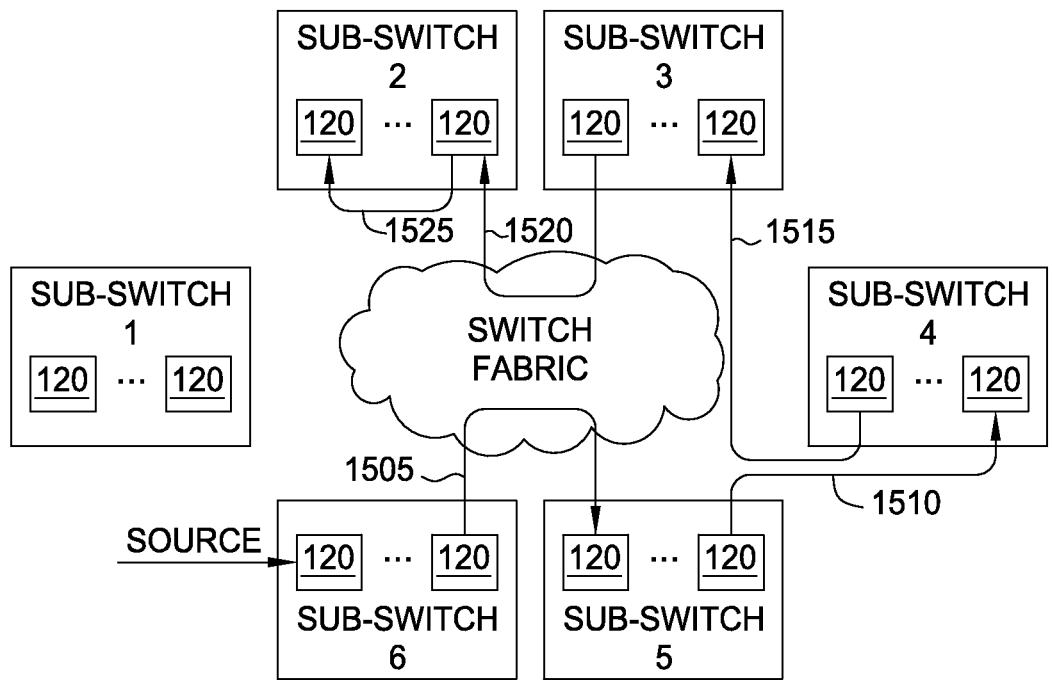
FIGS. 15A-C illustrate a system and technique for handling operational outages, according to embodiments described herein.
Figure 15B:
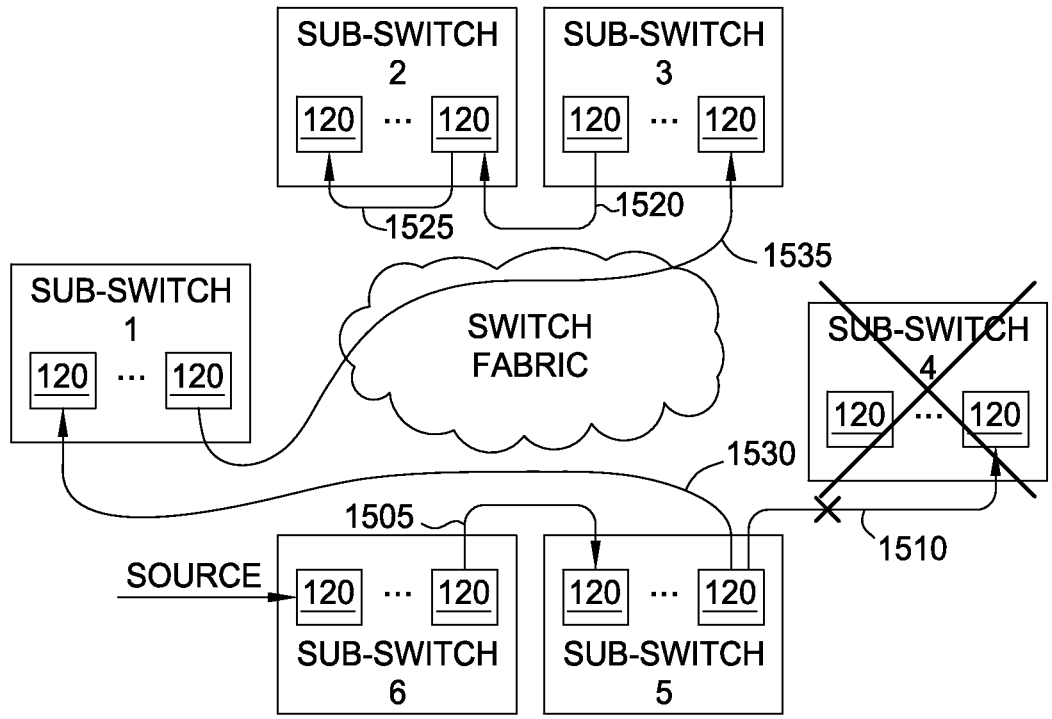
Figure 15C:
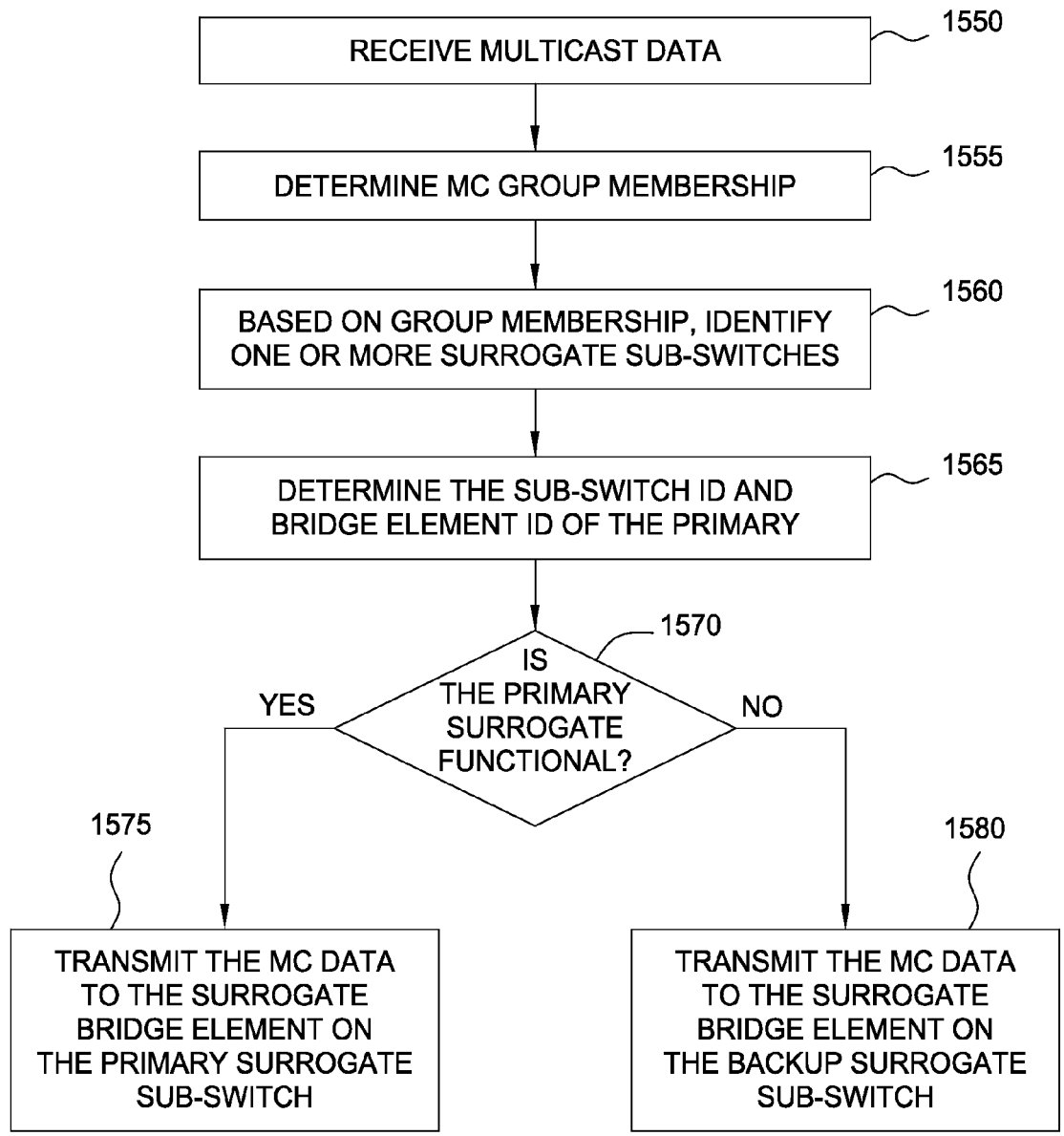

FIGS. 15A-C illustrate a system and technique for handling operational outages. FIG. 15A illustrates a portion of the distributed switch that uses a four level hierarchy to forward multicast data to a destination sub-switch. Here, the receiving sub-switch (sub-switch 6) receives the multicast data frame on an ingress port of one of its bridge elements 120. Based on the MC group membership and the hierarchical data, sub-switch 6 forwards multicast data with the multicast data to sub-switch 5 (a Level A surrogate) along data path 1505. Sub-switch 5 performs a similar analysis and forwards multicast data to the Level B surrogate sub-switch 4 along data path 1510. After using its local copy of the MC group table 1210 and hierarchical data 1220, sub-switch 4 forwards the multicast data to the Level C surrogate sub-switch 3 along data path 1515 which forwards the multicast data to the Level D surrogate sub-switch 2 using data path 1520. Because sub-switch 2 is one of the destinations of the MC group, it uses the local port mask 1330 to identify the correct bridge element and transfer the multicast data to the bridge element along data path 1525. Although not shown, the local bridge element transmits a resulting data frame to the destination computing device using the local port.

Note that data paths 1505-1520 run through the switch fabric while data path 1525 may be a local transfer within sub-switch 2.

FIG. 15B illustrates the same system as the one shown in FIG. 15A except with an operational outage. In this case, sub-switch 4 is temporarily unavailable, been removed, or malfunctioned. Alternatively, the data path 1510 may have been disconnected or severed. In either case, the outage prevents sub-switch 5 from forwarding multicast data to sub-switch 4. For this situation, the distributed switch may include a hardware notification system that, once it detects a sub-switch is unavailable, transmits a broadcast message to all the sub-switches in the distributed switch. Based on this notification, sub-switch 5 uses the backup sub-switch ID 1420 and bridge element ID 1425 shown in FIG. 14 when transmitting to the Level B surrogate. In this case, the sub-switch ID 1420 is sub-switch 1. Once sub-switch 1 receives the multicast data along data path 1530, it determines which surrogate level it is and, based on the hierarchy data, forwards the multicast data to sub-switch 3 (i.e., the Level C surrogate) using data path 1535.

Alternatively, because each surrogate sub-switch can operate independently, the hierarchical data 1220 may be different for each sub-switch. That is, sub-switch 1 may forward the multicast data to a different Level C surrogate. So long as this different surrogate and surrogate sub-switch 3 are assigned to the same group of destination sub-switches in the hierarchy (i.e., a group that includes sub-switch 2), then the multicast data will reach its correct destination. Using a different Level C surrogate when using a backup Level B surrogate may be preferred if sub-switch 3 and 4 are arranged in the distributed switch such that if one sub-switch is down the other is also likely to be unavailable. Instead of requiring sub-switch 1 to attempt to forward the multicast data to sub-switch 3, the controller may have previously configured the hierarchical data 1220 of sub-switch 1 to use a different Level C surrogate—i.e., a different primary switch ID 1410 and bridge element ID 1415—than sub-switch 3.

Eventually, the controller may update the hierarchy data 1220 of sub-switch 5 to provide a different primary sub-switch to replace sub-switch 4.

FIG. 15C illustrates a technique for handling an outage. At step 1550, a sub-switch receives multicast data. The data could either be a received multicast data frame from a connected computing device or multicast data received from another sub-switch within the distributed switch.

At step 1555, the receiving bridge element on the receiving sub-switch determines the MC group membership using, for example, the sub-switch mask 1325 of FIG. 13. Once the destination sub-switches are identified, the bridge element may determine what type of hierarchy is being used to forward the multicast data. Moreover, the multicast data may inform the receiving bridge element the current level of the hierarchy—i.e., if the sub-switch received the packet from an upper-level surrogate—so the receiving sub-switch knows which portion of the hierarchy to reference.

At step 1560, the bridge element compares the group membership with the hierarchy (e.g., a tree structure) to determine which surrogates should receive the multicast data. That is, if the bridge element determines that it received the multicast data from an upper-level surrogate, then it evaluates the lower-level surrogates to determine which of these surrogates should receive a copy of the multicast data.

Using FIG. 10 as a reference, assume that the receiving sub-switch is surrogate 3. This surrogate then determines which members of the MC group are also in the group of sub-switches assigned to it (i.e., sub-switches 12:23). If sub-switches 12:23 are MC group members, then each of the Level C surrogates that is below surrogate 3 (i.e., surrogates 8:10) receive the multicast data. However, if only sub-switches 12:16 are in the MC group, then only surrogates 8 and 9 receive the multicast data from surrogate 3.

Once the lower-level surrogates are identified, the receiving sub-switch uses the surrogate identification registers 1405 to determine the location information required to route the multicast data to the identified surrogates. Specifically, the location information may include the primary sub-switch ID 1410 and bridge element ID 1415.

Before forwarding the multicast data, at step 1570 the sub-switch may determine whether it has received a notification that indicates that the intended surrogate (or surrogates) is unavailable. This disclosure, however, is not limited to any specific method of determining if a portion of the network is experiencing an outage. For example, the sub-switch may first transmit the multicast data without determining whether the destination sub-switch is available. However, if the sub-switch later determines the multicast data was not received (e.g., an acknowledgement signal was not received) it may infer there is a system outage.

If the primary surrogate is functional, at step 1575, the sub-switch transmits the multicast data to the surrogate sub-switch and bridge element listed in the sub-switch ID 1410 and bridge element ID 1415.

If not, at step 1580, the sub-switch transmits the multicast data to the backup surrogate sub-switch and bridge element listed in the backup sub-switch ID 1420 and bridge element ID 1425.

Figure 16A:
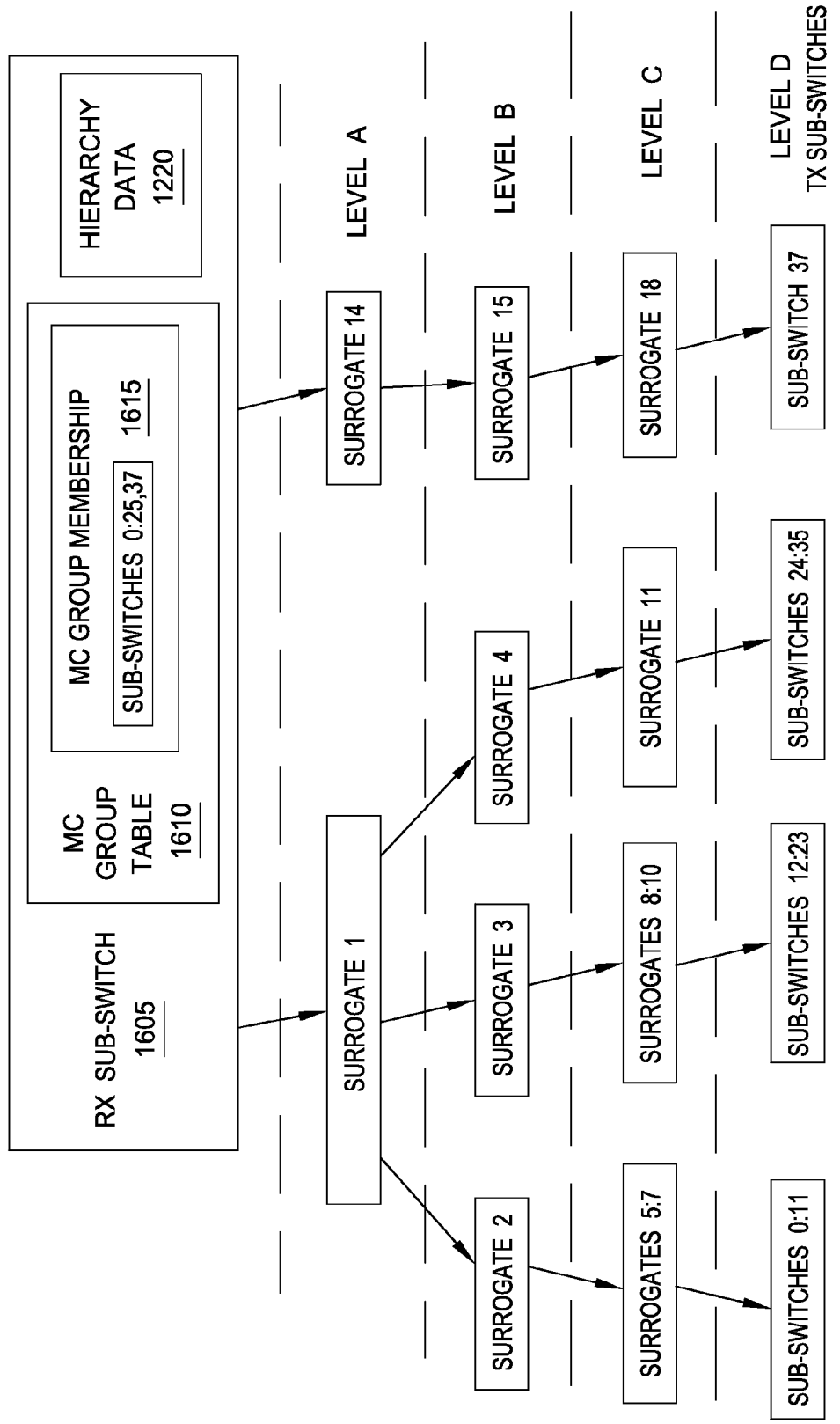
FIGS. 16A-D illustrate systems and a technique for optimizing a hierarchy, according to embodiments described herein.

FIGS. 16A-D illustrate systems and a technique for optimizing a hierarchy. FIG. 16A is similar to FIG. 12 except that the MC group membership 1615 has been changed to include sub-switches 0:25 and sub-switch 37. Based on the hierarchy 1000 shown in FIG. 10, in order to deliver the multicast data to each of the sub-switch members of the MC group, the Rx sub-switch 1605 forwards multicast data to both surrogates 1 and 14. These surrogate sub-switches in turn forward the multicast data to the appropriate Level B surrogates, and so on. However, this may result in the multicast data being unnecessarily transmitted to one or more of the surrogates.

Figure 16B:
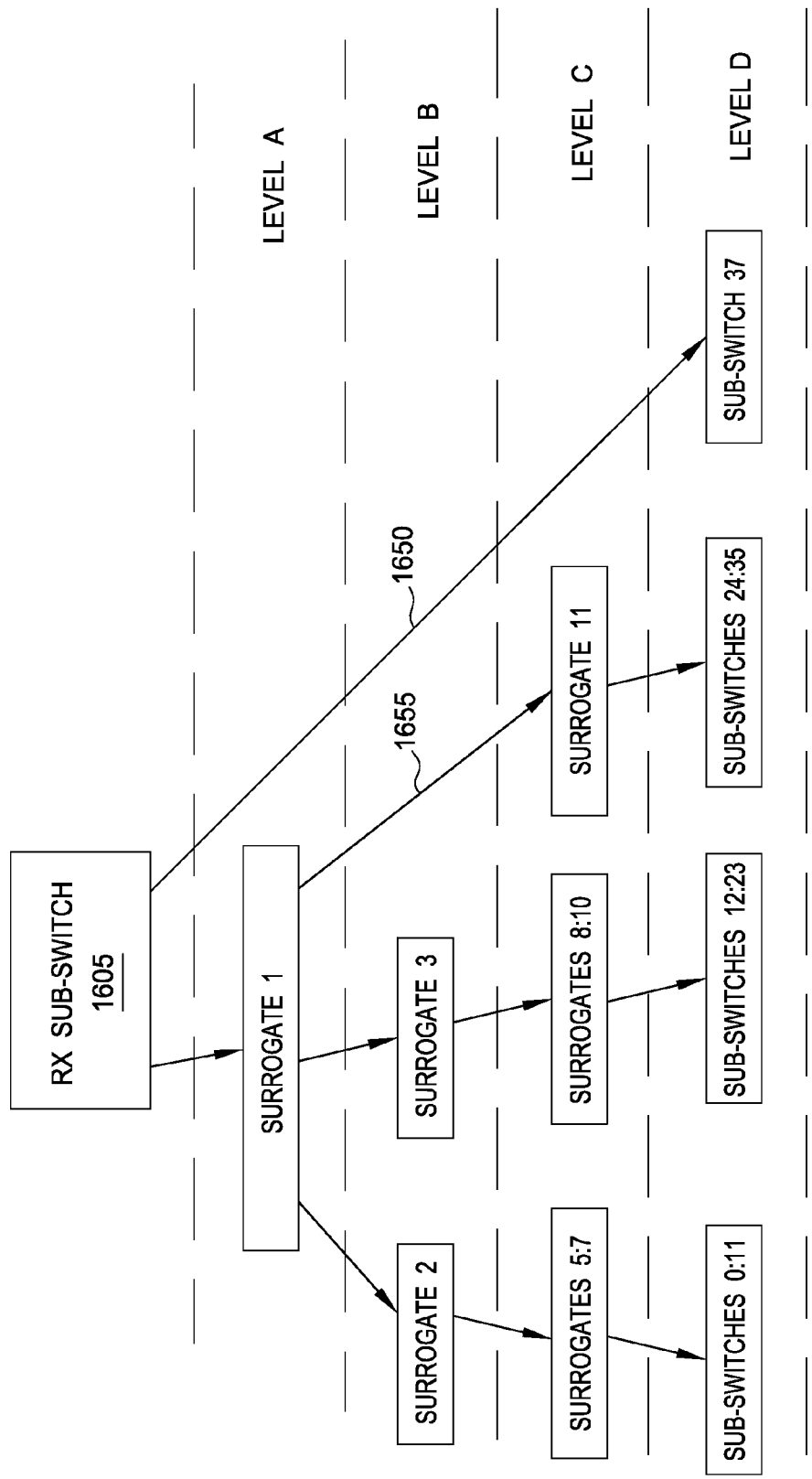

FIG. 16B illustrates the results of the sub-switches optimizing the hierarchy shown in FIG. 16A. Specifically, the traversal path of the multicast data in FIG. 16B avoids unnecessary intermediate transfers to surrogates. As shown, instead of the multicast date being forwarded sequentially from surrogate 14 to surrogate 15 and then to surrogate 18, the multicast data is forwarded along data path 1650 directly to sub-switch 37. Because the surrogates may be used to transmit the multicast data using two connection interfaces in parallel to increase bandwidth, when they are using only one connection interface, latency may be improved by skipping the surrogates. Accordingly, each surrogate that transmits the multicast data to only one destination may be skipped.

Data path 1655 shows another location where the hierarchy was optimized. When evaluating which Level A surrogates to forward the multicast data to, the Rx sub-switch 1605 may use the hierarchy data 1220 to determine that because surrogate 1 will need to forward the data to a plurality of surrogates, surrogate 1 cannot be skipped. Accordingly, Rx sub-switch 1605 forwards to multicast data to surrogate 1. However, because surrogate 4 will only forward the data to one surrogate, i.e., surrogate 11, surrogate 1 may skip surrogate 4 and transmit the multicast data directly to surrogate 11. Moreover, surrogate 1 may determine that surrogate 11 cannot be skipped because it is responsible for delivering the multicast data to two destination switches—i.e., sub-switches 24 and 25. Because each surrogate operates independently and can access the hierarchical data for at least the hierarchical levels that are below the current level, the surrogates can still increase the available bandwidth according to the number of destination sub-switches as well as avoid some unnecessary latency from transmitting the multicast data to surrogates that use only one connection interface to forward the multicast data.

In one embodiment, the ability to optimize the different is possible because each sub-switch or, at least each surrogate sub-switch, contains hierarchy data for levels of the hierarchy that are below their current level. Thus, the sub-switches are able to determine, using the tree structure of the hierarchy, how many sub-switches each of the lower-level surrogates must forward the multicast data to.

Figure 16C:
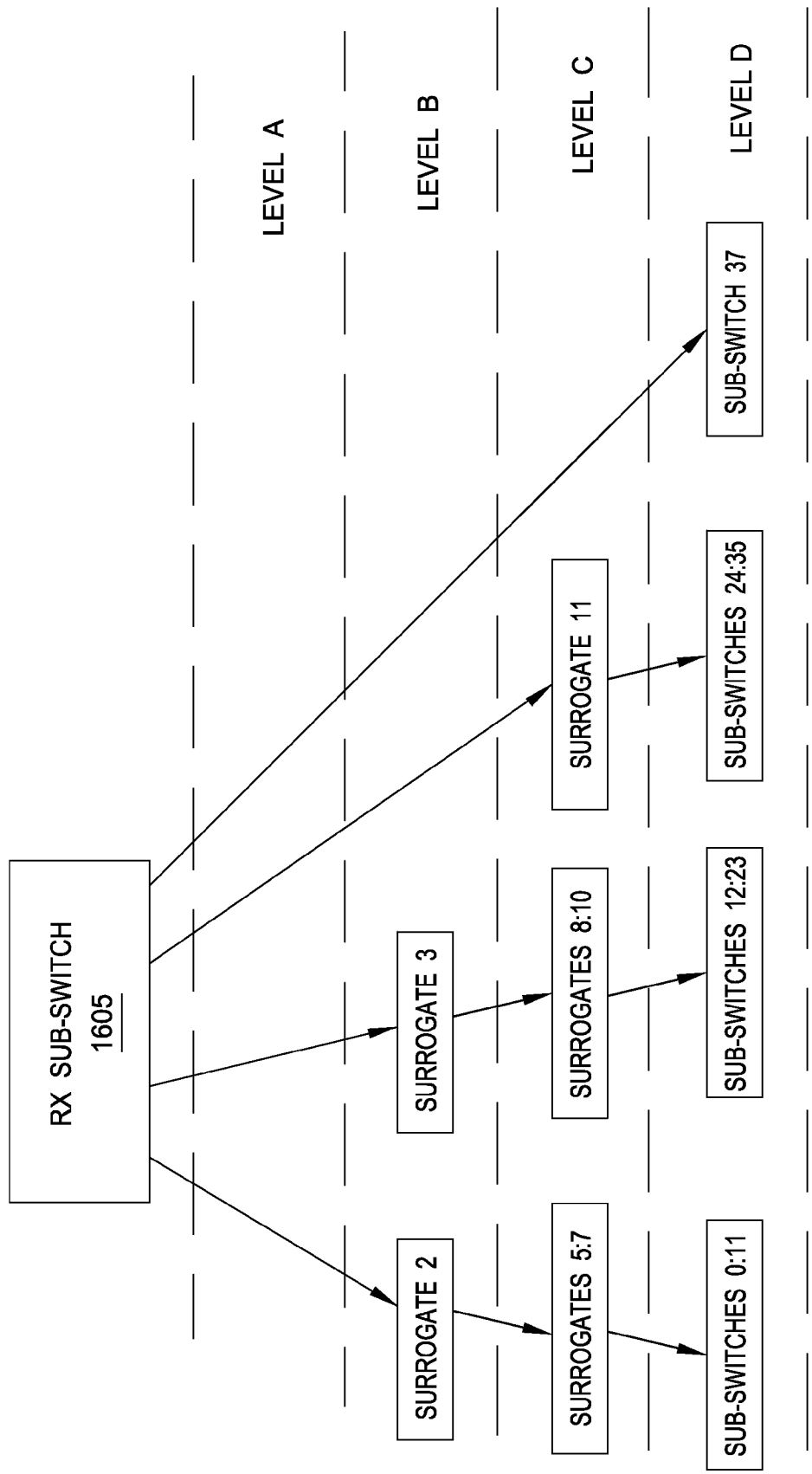

FIG. 16C illustrates another optimization that may be performed. Specifically, FIG. 16C optimizes the system shown in FIG. 16A by identifying unused connection interfaces. As shown in FIG. 11, the Rx sub-switch 1105 may assign four of the connection interfaces 455 for forwarding the multicast data to four other sub-switches. Based on this illustrated assignment, in FIGS. 16A and 16B, the Rx sub-switch 1605 uses only two of the four assigned connection interfaces to forward the multicast data to other sub-switches. In contrast, the Rx sub-switch 1605 in FIG. 16C uses all four of the connection interfaces, thereby avoiding transmitting the multicast data to surrogate 1.

After the Rx sub-switch 1605 identifies the surrogates, it determines the total number of available connection interfaces. The sub-switch 1605 then determines whether one of the identified surrogates transmits the multicast data to a number of sub-switches that is less than or equal to the number of available connection interfaces plus the connection interface assigned for the surrogate. Here, Rx sub-switch 1605 has two available connection interfaces plus the connection interface assigned to transmit data to surrogate 1. Because surrogates 1 will forward the multicast data to only three other sub-switches (surrogates 2, 3, and 11), the Rx sub-switch 1605 may instead directly forward the multicast data to these three sub-switches.

Similar to the optimization shown in FIG. 16B, the optimization shown in FIG. 16C also skips surrogates that transmit only to one other sub-switch. That is, because Rx sub-switch 1605 has one connection interfaces assigned to surrogate 14 and surrogate 14 only transmits multicast data to one other sub-switch (i.e., surrogate 15), based on the relationship expressed above, sub-switch 1605 determines it can transmit directly to surrogate 15. When a similar analysis is applied to surrogates 15 and 18, it results in transmitting the multicast data from the Rx sub-switch 1605 directly to the sub-switch 37.

In another embodiment, the sub-switch skips a hierarchical level (e.g., Level A) if the level forwards the data to four or fewer total sub-switches in the next hierarchical level (e.g., Level B). As applied to FIG. 16A, surrogates 1 and 4 only transmit data to four total sub-switches in the next hierarchical level (Level B). Accordingly, these surrogates may be skipped and the four connection interfaces of Rx sub-switch 1605 may transmit the multicast data directly to the Level B surrogates. Combining this optimization with the optimization shown in FIG. 16B (i.e., skipping a surrogate if it transmits to only one other sub-switch) would result in the optimized hierarchy shown in FIG. 16C.

Although not shown in FIGS. 16A-C, when determining to skip a lower-level surrogate, in one embodiment an upper-level surrogate may consider whether the lower-level surrogate is also a destination sub-switch. For example, if surrogate 4 was sub-switch 24, then it may not be skipped since surrogate 4 must forward the multicast data to one of its local ports as well as to sub-switch 25. However, surrogate 11 in this scenario could be skipped because it would forward the multicast data only to sub-switch 25 since sub-switch 24 (i.e., surrogate 4) has already received the data. The upper-level surrogate may determine which surrogates are also destination sub-switches (i.e., which surrogates have local ports/bridge elements coupled to destination computing devices) by referencing the surrogate identification registers 1405.

Further, even though FIGS. 16A-B illustrate skipping surrogates in a four level hierarchy, this same process may be used for any type of hierarchy that uses surrogate sub-switches.

Figure 16D:
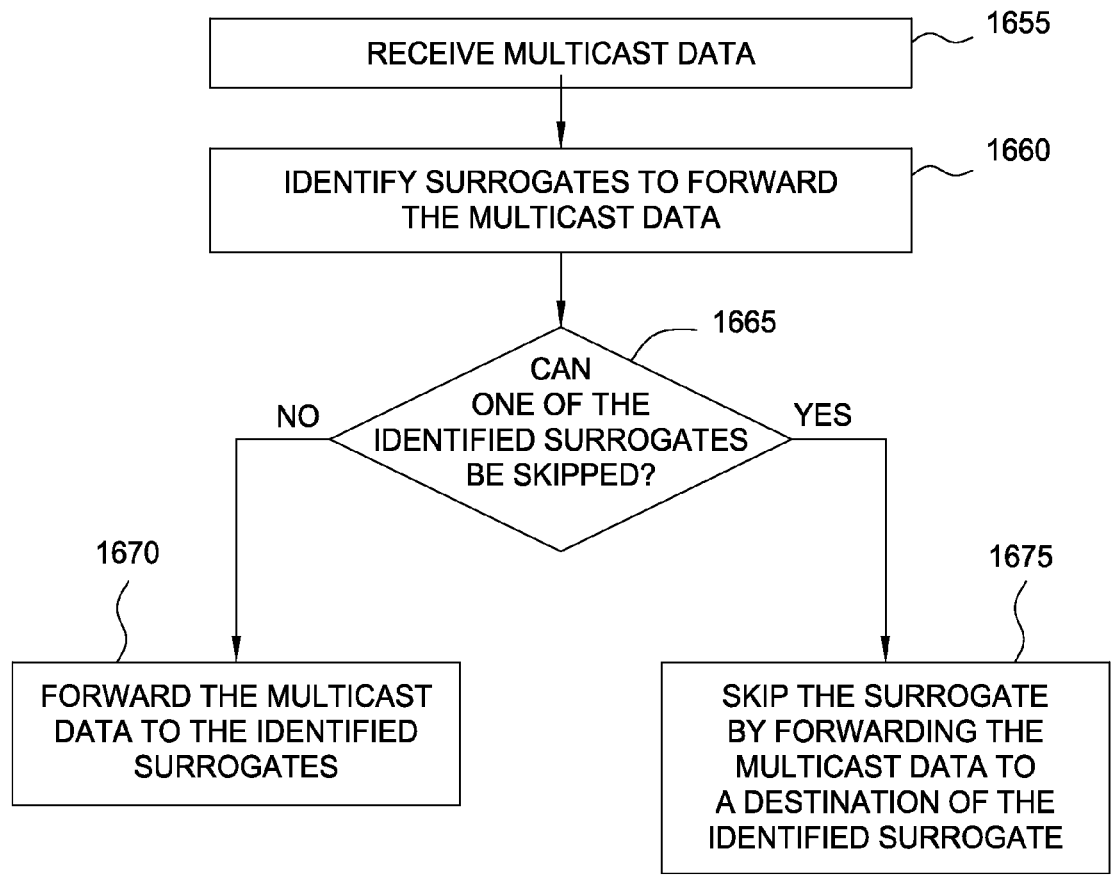

FIG. 16D is a technique 1600 for optimizing the traversal of a hierarchy. At step 1655, a surrogate or receiving sub-switch receives the multicast data, and at step 1660, identifies the surrogates that should be forwarded the multicast data. Specifically, the sub-switch may use a local copy of the MC group table 1210 to identify the MC group members and, based on the hierarchy data 1220, determine to which surrogates these group members are assigned.

At step 1665, the sub-switch evaluates whether the identified surrogates can be skipped. As disclosed above, this determination may be based on whether the surrogate transmits the multicast data to only one other sub-switch, whether one of the identified surrogates transmits the multicast data to a number of sub-switches that is less than or equal to the number of available connection interfaces plus the connection interface assigned for the surrogate, or whether the identified surrogates forward the data to fewer total sub-switches than the receiving switch has assigned connection interfaces.

Moreover, the sub-switch may consider if the surrogate is also a destination sub-switch that will forward the multicast data to a local bridge element port.

If the surrogate cannot be skipped, at step 1670 the sub-switch forwards the multicast data to the identified surrogate.

However, if the surrogate can be skipped, at step 1675 the sub-switch may skip the surrogate by forwarding the multicast data directly to the sub-switch that is in a lower level of the hierarchy than the identified surrogate.

The controller may enable and disable this optimization by changing the value of the optimization enable bits 1320 for each of the MC groups listed in the MC group tables 1210. That is, the different methods of optimizing may provide different advantages. For example, ensuring that the maximum number of connection interfaces is used on each sub-switch may reduce the switch traffic between surrogates but may also prevent other switch traffic associated with different bridge elements on the sub-switch from using the connection interfaces. Thus, the controller or system administrator may consider these pros and cons when setting the optimization enable bits 1320.

Mulitcast Frame Delivery to Aggregated Links

Link Aggregation Control Protocol is defined by the IEEE 802.3ad standard. Specifically, link aggregation (also known as trunking or link bundling) is a process of binding several physical links into one aggregated (logical) link or trunk (in this disclosure, "trunk" and "aggregated link" are used interchangeably). Traffic is sent across the links in a manner such that frames constituting flows between two end nodes always take the same path. This is typically accomplished by hashing selected fields of the frame header to select the physical link to use. Doing so may balance the traffic across the group of physical links and avoid mis-ordering of the frames in a given flow.

Figure 17:
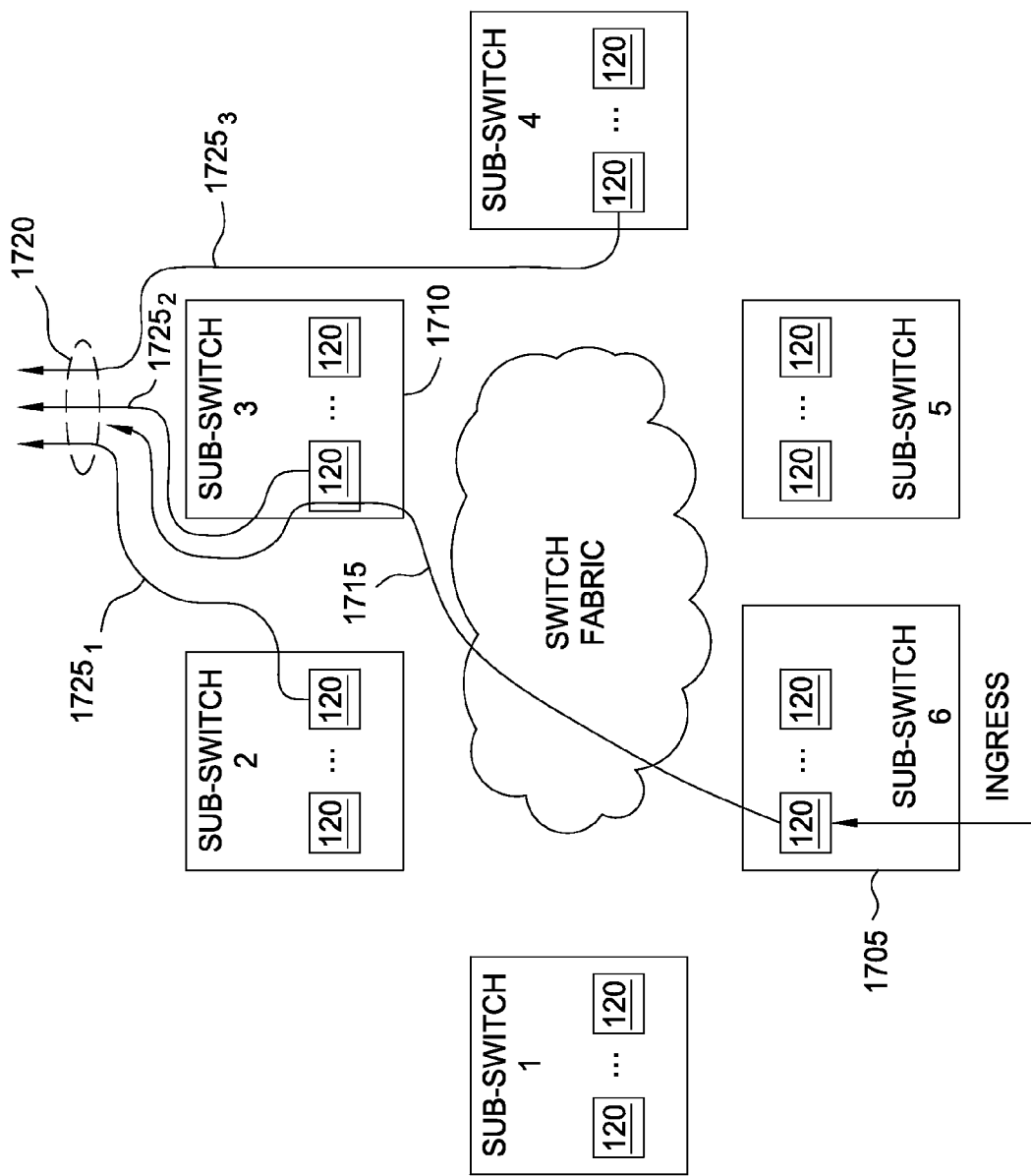
FIG. 17 illustrates transmitting a unicast data frame to a physical link of a trunk, according to one embodiment described herein.

FIG. 17 illustrates transmitting a unicast data frame in the distributed switch to one physical link of a trunk. Specifically, the source sub-switch 1705 receives the unicast data frame from a beginning node (e.g., a server, application running on a computing device, etc.) through the sub-switch's ingress port at one of its bridge elements 120. Before forwarding the unicast data to an end node (e.g., a switch, server, application, etc.) connected to the distributed switch via the trunk 1720, the source sub-switch 1705 may use the link aggregation control protocol to determine which of the three physical links 1725$_{1-3}$ to use when routing the unicast data. This process is referred to herein as the "link selection." As defined by the standard, the source sub-switch 1705 uses information in the header (e.g., the destination and source MAC addresses and/or EtherType) of the unicast data frame to select one of the physical links 1725$_{1-3}$. Thus, if another unicast data frame is received with the same MAC addresses and/or EtherType in the header, that frame will also use the same data path to arrive at the end node as the previous unicast data frame.

The source sub-switch 1705 receives the unicast data frame and performs link selection based on the information contained in the header. For example, the link selection may be configured that even if the headers of two unicast data frames contain the same source and destination MAC addresses but different EtherTypes (e.g., IPv4 versus IPv6), the source sub-switch 1705 uses different physical links 1725$_{1-3}$ to forward the packets. Stated differently, the header fields are used as a hash key and compared to trunk configuration information to select the physical link 1725 of the trunk 1720. In this manner, link selection may disperse the traffic using the same trunk across the different physical links 1725$_{1-3}$. Moreover, because the same header fields result in selecting the same physical link 1725, the order of the data traffic is maintained.

In the example shown in FIG. 17, the source sub-switch 1705 selected physical link 1725$_2$ as the appropriate physical link. Data path 1715 illustrates that sub-switch 6 forwards the unicast data to the destination sub-switch 1710 (i.e., sub-switch 3) which then transmits the unicast data frame to the end node via physical link 1725$_2$.

FIG. 18 illustrates transmitting a multicast data frame to a physical link of a trunk using surrogates. Instead of receiving a unicast data frame, sub-switch 6 receives a multicast data frame on an ingress port. The sub-switch 6 may parse the multicast data frame and identify the header fields necessary to create the hash key. However, in one embodiment, the sub-switch 6 may not be able to determine which physical link (or port) of the trunk 1720 to use because the sub-switch 6 does not store the local port information for any other sub-switch. As discussed previously, the sub-switches in the distributed switch may contain sub-switch mask information for all the different sub-switches in the distributed but may not store the local port information for the different sub-switches. The receiving sub-switch may not know which local ports are part of the trunk 1720, and thus, be unable to send the multicast data frame to the sub-switch with the correct port as defined by the hash key.

Because of limited area on the semiconductor chips comprising the sub-switches, storing the local port information for the different trunks on each sub-switch may be impossible. As shown by FIG. 13, the local port information for each MC group may require 40 bits. In a system with hundreds of sub-switches and hundreds of MC groups that may each enable different local ports, the memory requirements for storing the local port information for all the sub-switches is impracticable. Instead, the distributed switch may delay selecting which port of the trunk to use. That is, a sub-switch that is different from the sub-switch that receives the multicast data frame may perform link selection.

Once sub-switch 6 receives a multicast data frame, it may generate the hash key and place that key in the header of each of the cells it creates to forward the multicast data to other sub-switches in the distributed switch. As shown by the data paths 1805, 1810 and 1815, sub-switch 6 forwards the cell containing the multicast data to a plurality of surrogates as defined by a hierarchy. As the surrogates receive the multicast data, they may use their local MC group tables to determine whether one of their local ports should receive a copy of the multicast data. For example, once the multicast data arrives at sub-switch 4, it will use the table and determine that indeed one of its bridge elements 120 is associated with a local port that is enabled for the MC group. However, because this local port is part of trunk 1720, the analysis does not end there.

Sub-switch 4 determines whether its local port should be used to transmit that particular multicast data in the trunk 1720. To make this determination, sub-switch 4 performs link selection by comparing the hash key in the header of the cell to trunk configuration data. If this process yields a port ID that matches the local port on sub-switch 4, then sub-switch 4 transmits the multicast data to the end node using physical connection 1725$_3$. However, as shown by data paths 1820 and 1825, sub-switch 4 determines its local port should not be used and continues to forward the multicast data based on the hierarchy. When the multicast data is received on sub-switch 3, it also may determine the correct port based on the hash key. Because the resulting trunk port ID matches the local port of sub-switch 3, it uses data paths 1830 and 1835 to forward the multicast data frame to the end node using connection 1725$_2$. All subsequent multicast data frames with the same hash key will also be forwarded along data path 1835. Of course, different hash keys may result in physical connections $1725_1$ or $1725_3$ being used to transmit the multicast data instead of physical connection $1725_2$.

In this manner, the link selection (i.e., determining which port and corresponding physical connection will forward the multicast data frame) is done at a sub-switch different from the receiving sub-switch.

Figure 19:
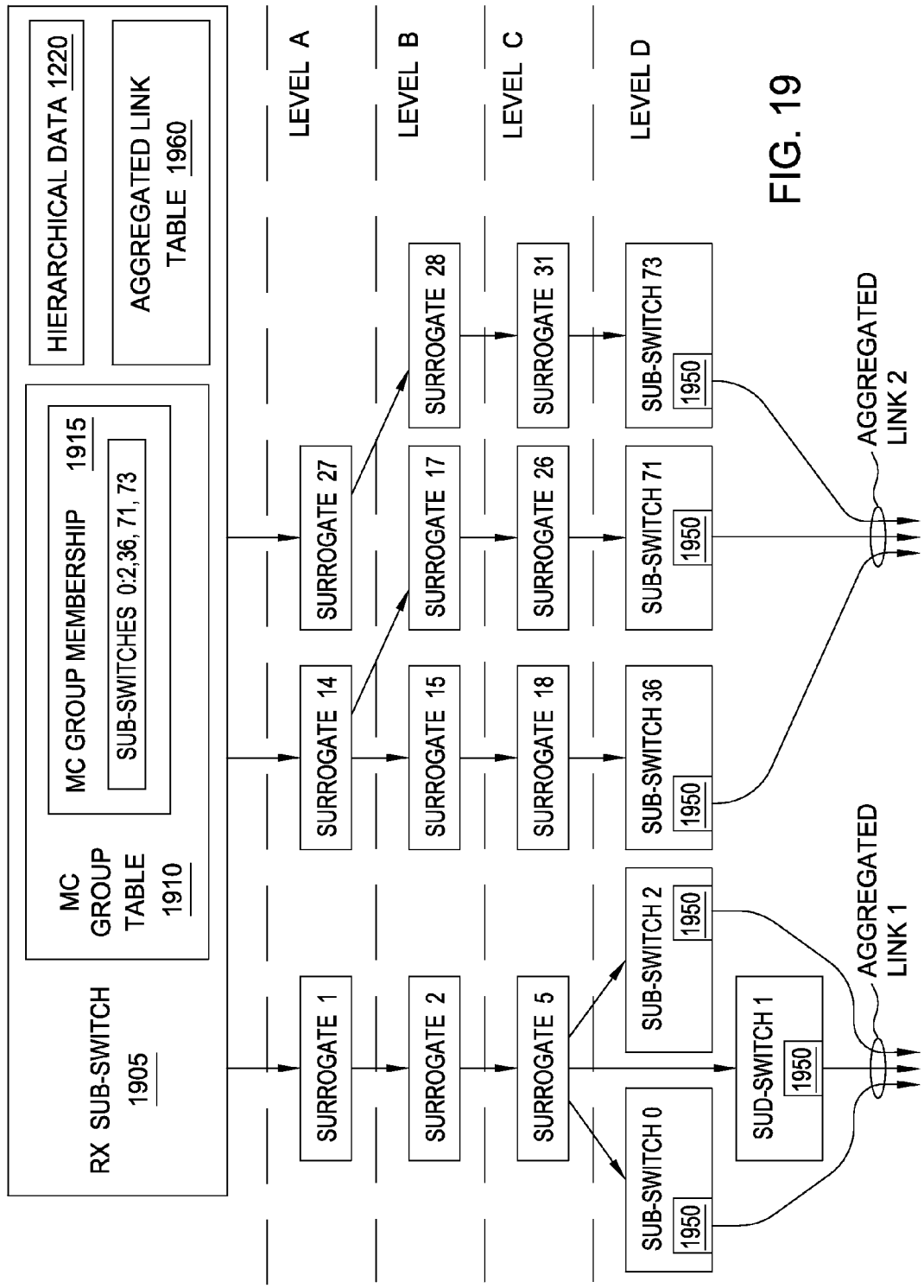
FIG. 19 illustrates transmitting a multicast data frame to destination switches assigned to at least two trunks, according to one embodiment described herein.

FIG. 19 illustrates transmitting a multicast data frame to destination switches assigned to at least two trunks. The MC group membership may include any number of trunks or aggregated links. Here, ports 1950 of sub-switches 0:2 make up Aggregated Link 1 while ports 1950 of sub-switches 36, 71 and 73 make up Aggregated Link 2. Sub-switches associated with the same aggregated link may be located on different chassis or racks. For example, sub-switch 71 may be physically located on a separate rack from sub-switch 73.

In one embodiment, the Rx sub-switch 1905 uses the MC group membership 1915 in the MC group table 1910 to determine the destination sub-switches (i.e., sub-switches 0:2, 36, 71, and 73) for the multicast data. Using the hierarchical data 1220, the Rx sub-switch identifies which Level A surrogates should be provided a copy of the multicast data in order for the data to reach the destination sub-switches. Using FIG. 10 as the example hierarchy, FIG. 19 illustrates the propagation of the multicast data through Levels A-D of the hierarchy. Of course, in other embodiments, the hierarchy may be optimized such that one or more of the surrogates are skipped.

Even though the MC group membership 1915 specifies that all of the sub-switches associated with Aggregated Links 1 and 2 receive the multicast data, the Aggregated Link Control Protocol stipulates that only one of the ports 1950 for each of the aggregated links may be selected to transmit the multicast data. Moreover, the same link must be used for any subsequently received multicast data frames that have the same relevant header portions. Thus, for each received multicast data frame of the MC group only one of sub-switches 0:2 transmits the multicast data frame in Aggregated Link 1 and only one of sub-switches 36, 71, 73 transmits the multicast data frame in Aggregated Link 2.

The aggregated link table 1960 may be stored on each sub-switch in the distributed switch. The aggregated link table 1960 may include trunk configuration information that when compared to a hash key identifies a particular port as the selected port in the trunk. Specifically, a bridge element uses a trunk ID to index into the aggregated link table 1960 to indentify a particular trunk. The table 1960 lists each of the ports in the distributed switch that are part of the trunk. After identifying all the ports (or physical connections) in the distributed switch associated with a particular port, the bridge element uses the hash key to identify one port in the trunk as the selected port. Accordingly, each hash key uniquely identifies only one port (i.e., the selected port) in the trunk (although multiple hash keys may map to the same port). Once the sub-switch identifies the selected port ID from the aggregated link table 1960, it can compare that ID to its local port IDs and determine if they match. If so, the sub-switch provides a copy of the multicast data to that local port which is then forwarded to the end node via the aggregated link.

Figure 20A:
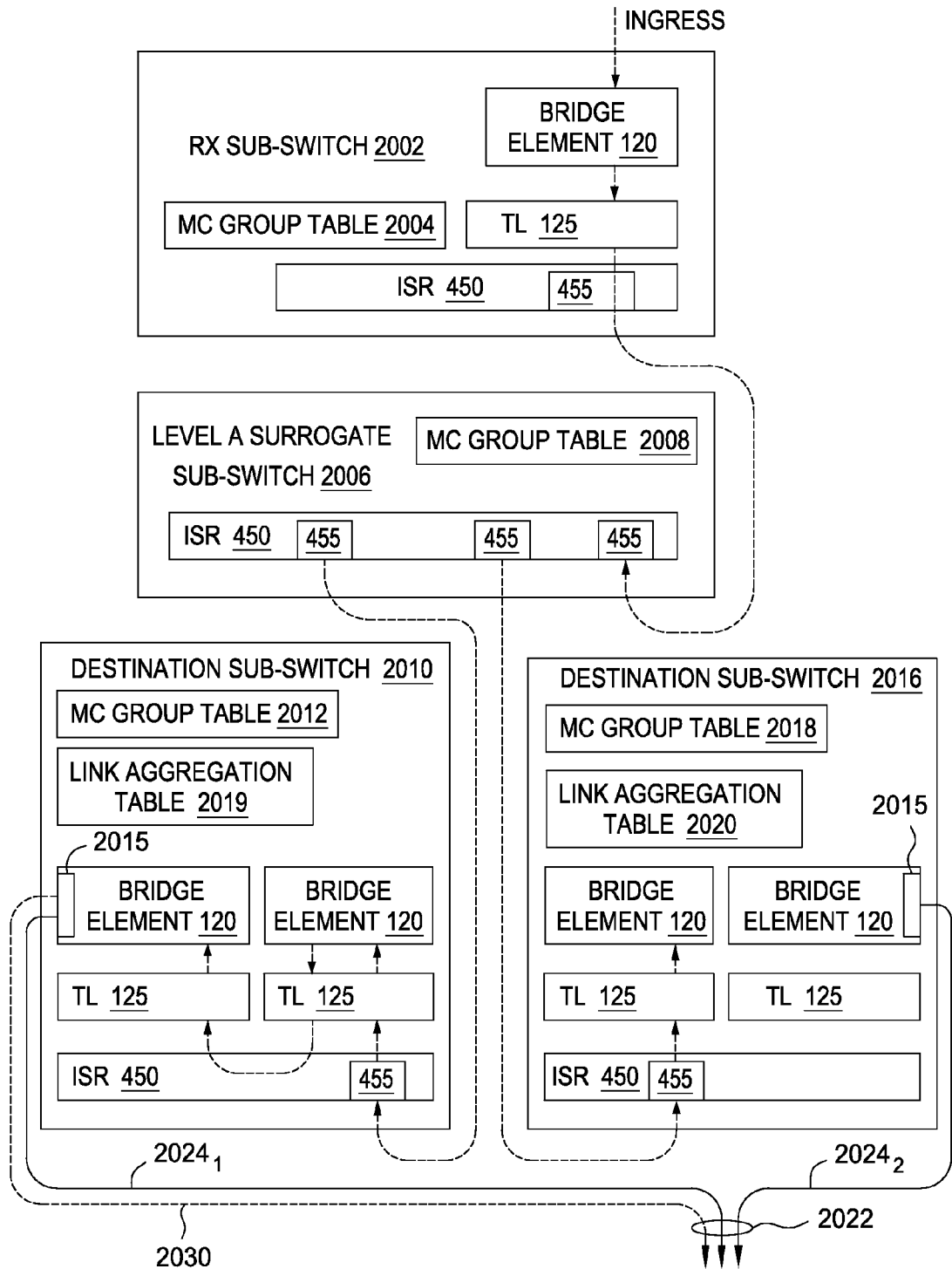
FIGS. 20A-20C illustrate transmitting a multicast data frame to a physical link of a trunk using three different modes, according to embodiments described herein.
Figure 20B:
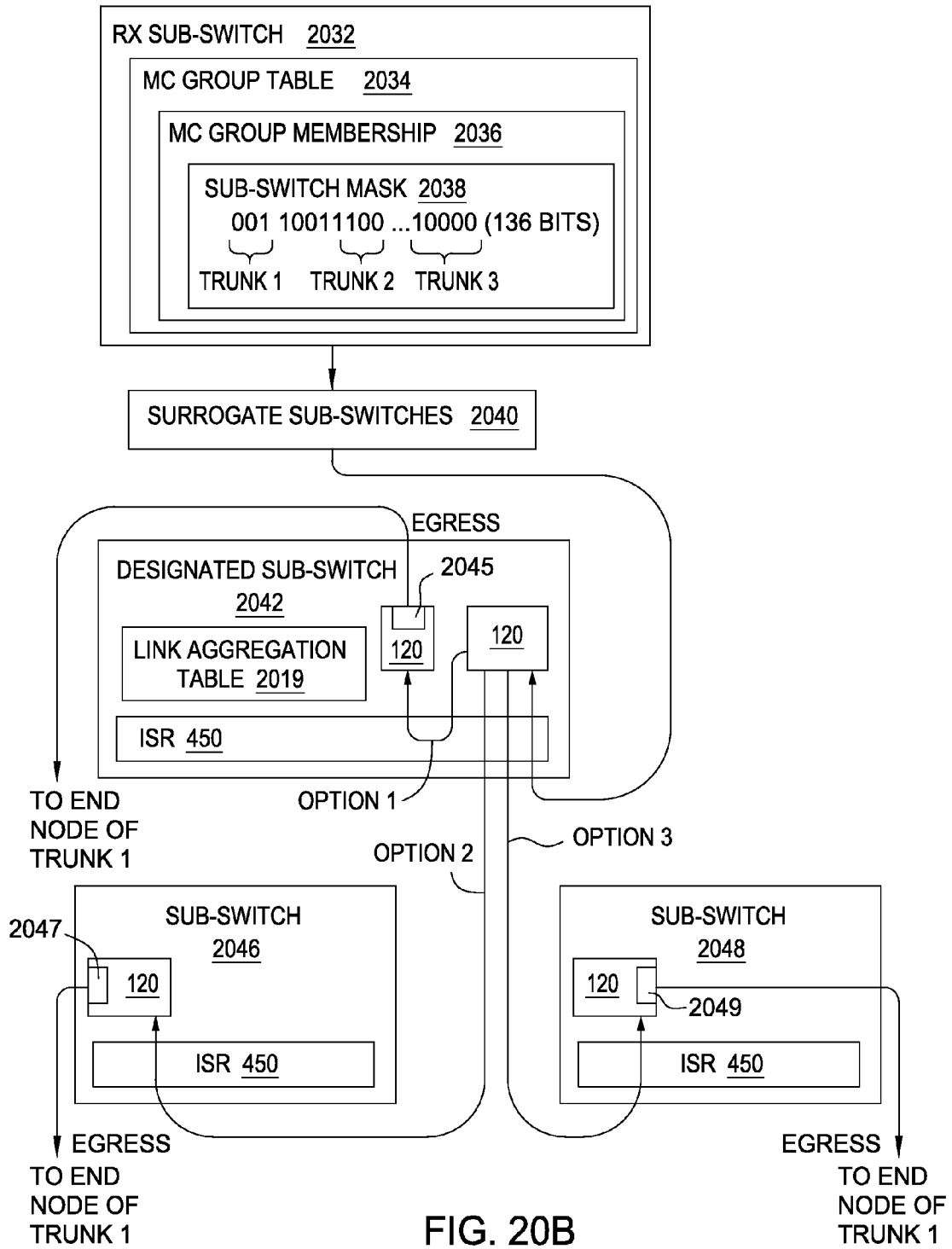
Figure 20C:
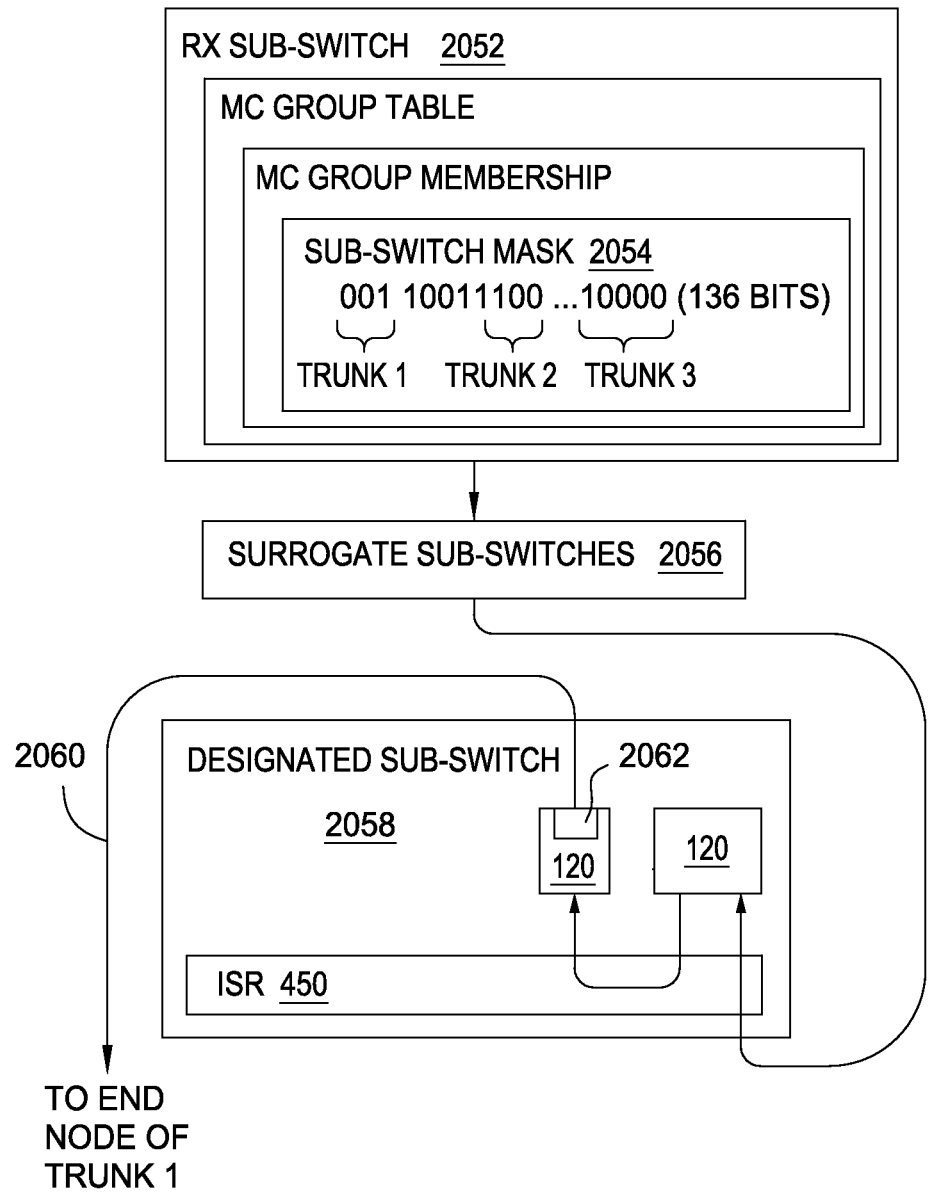

FIGS. 20A-C illustrate three embodiments for transmitting multicast data in a distributed switch that implements a hierarchy. However, the present disclosure is not limited to these embodiments.

The trunk mode bits 1315 for each MC group may be used to instruct the sub-switches which of the three embodiment to use when receiving multicast data belonging to the MC group.

Embodiment 1

FIG. 20A illustrates transmitting the multicast data frame to each member of the MC group. In this embodiment, the Rx sub-switch 2002 uses the MC group table 2004 to determine that both destination sub-switches 2010 and 2016 are members of the MC group to which the multicast data frame belongs. Assuming a simply one level hierarchy, Rx sub-switch 2002 forwards the multicast data through its ISR 450 and to the Level A surrogate sub-switch 2006. In this example, both of the destination sub-switches 2010 and 2016 are assigned to the Level A surrogate 2006. The surrogate sub-switch 2006 uses two connection interfaces 455 to forward the multicast data to the destination sub-switches 2010 and 2016. The dashed lines illustrate the path of the multicast data as it propagates through the distributed switch.

Each destination sub-switch has two local ports 2015 that are connected to respective physical links $2024_{1-2}$ of trunk 2022. That is, the local port mask in the MC group tables 2012, 2018 of the respective destination sub-switches 2010, 2016 indicate that the ports 2015 are enabled for the MC group associated with the multicast data.

However, both local ports are associated with the same trunk 2022 as shown by the solid lines 2024. Thus, before the destination sub-switches 2010, 2016 transfer the multicast data to the ports 2015, both sub-switches 2010, 2016 may perform link selection, based on the received hash key, to determine if their local port 2015 is the correct local port.

For destination sub-switch 2016, the receiving bridge element 120 (i.e., the leftmost bridge element) uses the local port mask in the MC group table 2018 to determine whether one of its local ports is enabled for the MC group associated with the multicast data. Because local port 2015 is enabled (i.e., is a candidate for transmitting a copy of the multicast data to the end node), the bridge element 120 may determine the trunk ID associated with the local port 2015. This information may be stored in registers on the sub-switch 2016 that identify all the ports belonging to the trunk 2022. The bridge element 120 uses the trunk ID to index into the link aggregation table 2020 to identify the correct trunk and its associated ports. The hash key in the received cell header is then used to identify the selected port for. As shown here, the selected port for the particular hash key is not local port 2015 of destination sub-switch 2016. Accordingly, the receiving bridge element may disregard the multicast data (e.g., drop the packet/cell that contains the multicast data).

After the receiving bridge element 120 of destination sub-switch 2010 (i.e., the rightmost bridge element) receives the multicast data, it uses the local port mask in the MC group table 2012 to determine whether one of its local ports is enabled for the MC group associated with the multicast data. Because local port 2015 is enabled, the receiving bridge element 120 may use trunk registers to determine if the local 2015 belongs to a trunk. In this case, local port 2015 is part of trunk 2022. Using the hash key and the trunk ID for trunk 2022, the bridge element 120 hashes into the link aggregation table 2014 to determine if the resulting selected port has the same ID as the local port 2015. In this case, the port IDs match.

Thus, the receiving bridge element 120 forwards the multicast data to the bridge element 120 associated with the local port 2015 (i.e., the leftmost bridge element 120). Dotted line 2030 illustrates the bridge element 210 forwarding the multicast data frame from the destination sub-switch 2010 to the end node of the aggregated link using the physical link $2024_1$. If Rx sub-switch 2002 receives another multicast data frame with the same hash key, the multicast data will follow the same path as shown by the dotted lines (i.e., the multicast data frame is not transmitted from destination sub-switch 2016). However, a different hash key may result in destination sub-switch 2016 transmitting the multicast data frame along the trunk 2022 while destination sub-switch 2010 disregards the multicast data.

Using this process, link selection is delayed until the multicast data reaches a destination sub-switch that contains the local port information needed to indentify the correct local port to use when communicating on the trunk.

Destination sub-switch 2010 may perform the same process in parallel with destination sub-switch 2016. That is, both destination sub-switches perform link selection independently. Thus, both sub-switches 2010, 2016 may perform link selection at the same time but that is not a requirement.

Although not shown, this process may also be applied to a destination sub-switch that has two or more ports associated with a single trunk. For example, if destination sub-switch 2010 has two enabled ports associated with trunk 2022, only one of these enabled local ports will be the selected port. Thus, only the selected port transmits the multicast data while the other enabled port does not.

Although the multicast data is disregarded in the destination sub-switch that does not have the selected port, this embodiment may be preferred if the MC group contains a plurality of small aggregated links relative to a MC group with one or two large aggregated links. For an MC group comprising a significant number of small aggregated links (e.g., more than ten), even if the destination sub-switch does not have the selected port, it may need the multicast data for another local port that is a selected port for a different aggregated link (or for a port that is not part of any aggregated link). In contrast, if all the destination ports of an MC group are part of a single aggregated link, then transmitting the multicast data to all the sub-switches might be inefficient since all but one of the sub-switches will disregard the multicast data. Thus, the trunk mode bits 1315 for an MC group may be set based on the number and size of the aggregated links associated with the MC group.

In one embodiment, the hash key may not be transmitted along with the cell; instead, each of the destination sub-switches 2010, 2016 may generate the hash key. That is, the cells transmitted between the sub-switches may contain the necessary information from the header of the multicast data frame for generating the hash key.

Embodiment 2

FIG. 20B illustrates transmitting the multicast data frame to only one member of the MC group per trunk. Specifically, when establishing the MC group table, a master controller (i.e., a master IOMC) may ensure that only one port for each aggregated link in the MC group membership 2036 is enabled. For example, sub-switch mask 2038 includes at least three trunks (trunks 1, 2 and 3) where, for each trunk, only the sub-switch with the enabled port is listed as a destination of the multicast data. The destination sub-switch with the enabled port for each trunk is referred to herein as the designated sub-switch.

In contrast, the embodiment shown in FIG. 20A includes trunks where at least two ports on respective sub-switches are enabled. The Rx sub-switch forwards the multicast data to every sub-switch in the trunk with an enabled port even though the multicast data may be disregarded.

The Rx sub-switch 2032 uses the sub-switch mask 2038 of the MC group table 2034 to determine the MC group membership 2036. The controller has previously configured the sub-switch mask 2038 such that only one designated sub-switch exists for each trunk. Using the surrogate sub-switches 2040, the multicast data is forwarded to all the destination and designated sub-switches. Although the surrogate sub-switches 2040 route the multicast data to at least three designated sub-switches (and any number of destination sub-switches), for clarity, only one of the designated sub-switches is shown. Specifically, the Figure illustrates transmitting the multicast data for Trunk 1.

Designated sub-switch 2042 performs link selection to determine the correct local port based on the hash key. Because there are three sub-switches associated with Trunk 1, the designated sub-switch 2042 determines which of these sub-switches contains the correct selected port for the multicast data. Using the process described above, the receiving bridge element 120 (i.e., the rightmost bridge element) queries its local port mask and determines that it is the designated sub-switch for the trunk—i.e., it is the only sub-switch in the trunk with a port enabled. The receiving bridge element 120 may then query a trunk register to determine the trunk ID. With this ID and the hash key, the bridge element may indentify in the link aggregation table 2044 the selected port. If the enabled port 2043 on the designated sub-switch 2042 is the same as the selected port, then the enabled port 2043 is used to forward the multicast data frame to the end node. This is labeled as Option 1.

Alternatively, the designated sub-switches 2042 identifies which sub-switch associated with Trunk 1 has the selected port and forwards the multicast data to that sub-switch. For example, the designated sub-switch 2042 may have an additional section in the link aggregation table 2044 that identifies the location data and ID for all the other ports in Trunk 1. Based on this information, the designated sub-switch 2042 determines which of these port IDs matches the selected port. For example, if the selected port is port 2047 on sub-switch 2046, then the designated sub-switch 2042 transmits the multicast data to sub-switch 2046 (Option 2). However, if the selected port is port 2049 on sub-switch 2048, then the multicast data is forwarded to that sub-switch instead (Option 3).

In contrast to Embodiment 1 where a plurality of destination sub-switches in the trunk may perform link selection, here, only one of the sub-switches in each trunk performs link selection. However, where the selected port is not the enabled local port on the designated sub-switch, Embodiment 2 may add an additional hop relative to Embodiment 1 because the designated sub-switch transfers the multicast data to the sub-switch that contains the selected port (as shown by Options 2 and 3).

Note that the sub-switches 2046 and 2048 may be referred to as "destination" sub-switches even though the sub-switch mask 2038 of the Rx sub-switch (as well as the surrogate sub-switches 2040) do not know that the local ports on sub-switches 2046, 2048 are candidates for transmitting the multicast data. That is, the controller hides this information from the Rx sub-switch 2032 and surrogate sub-switches 2040 to prevent the multicast data from being sent to all three of the destination sub-switches 2043, 2046, 2048 when only one of these sub-switches will have a port that will be selected to transmit the data.

Embodiment 3

FIG. 20C illustrates transmitting the multicast data frame to only one member of the MC group per trunk. The primary difference between the third embodiment and Embodiments 1 and 2 is that no link selection is performed. Instead, the "selected port" for transmitting the multicast data frame may be chosen by the controller before the multicast data frame ever received by Rx sub-switch 2052.

Like in Embodiment 2, only one port is enabled per trunk per MC group. Thus, only the sub-switch with that enabled port is flagged in the sub-switch mask 2054 as a destination sub-switch (i.e., designated sub-switch 2058). Using the surrogate sub-switches 2056, the multicast data is forwarded to the designated sub-switch 2058. However, the designated sub-switch 2058 does not perform any link selection. Instead, the receiving bridge element 120 (the rightmost bridge element 120) uses the local port mask to determine the bridge element 120 associated with the enabled port—i.e., port 2062. The receiving bridge element 120 transfers the multicast data to the enabled port which then transmits a data frame to the end node via a physical connection 2060 of Trunk 1. Thus, the selected port is chosen by the controller when the controller populates the MC group table and enables only one port per trunk for a particular MC group. The port that is enabled is the selected port.

Advantageously, in contrast to Embodiment 1, Embodiment 3 avoids having to disregard multicast data when the data is transmitted to destination sub-switches that do not contain the selected port. Moreover, unlike in Embodiment 2, Embodiment 3 does not require the additional hop to go from a designated sub-switch to a destination sub-switch that has the selected port. However, Embodiment 3 does not benefit from the load balancing aspect of link selection. That is, if a multicast data frame in the same MC group is subsequently received but has a completely different source or destination MAC address and/or EtherType, the Rx sub-switch 2053 still transmits the multicast data to the designated sub-switch 2058 which uses the same port 2062 to transmit the subsequent data frame to the end node. In Embodiment 1 and 2, a different hash key may result in a different port being used. However, if MC traffic is a small percentage of the workload, then Embodiment 3 may be preferred since it does not inject additional traffic into the switch fabric.

CONCLUSION

The distributed switch may include a hierarchy with one or more levels of surrogate sub-switches (and surrogate bridge elements) that enable the distributed switch to scale bandwidth according to the size of the membership of a MC group. When a sub-switch receives a multicast data frame, it forwards the packet to one of the surrogate sub-switches. Each surrogate sub-switch may then forward the packet to another surrogate in a different hierarchical level or to a destination computing device. Because the surrogates may transmit the data frame in parallel using two or more connection interfaces, the bandwidth used to forward the multicast packet increases for each surrogate used.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product of forwarding a multicast data frame in a distributed switch comprising a plurality of switches, the computer program product comprising:
a non-transitory computer-readable storage medium having computer-readable program code embodied therewith, the computer-readable program code comprising computer-readable program code configured to:
receive a multicast data frame on a receiving port of an ingress switch in the distributed switch, wherein the receiving port of the ingress switch is associated with a first bridge element;
determine destination switches in the distributed switch that should receive at least a portion of the multicast data frame, wherein the portion of the multicast data frame is at least a portion of a payload of the multicast data frame, and wherein at least one connection interface in the ingress switch is configured to forward the portion of the multicast data frame from the first bridge element to a second bridge element in the ingress switch; and
forward the portion of the multicast data frame from the ingress switch to a first surrogate switch in a hierarchy, wherein the first surrogate switch is assigned in the hierarchy to forward the portion of the multicast data frame to both of: a computing device coupled to the first surrogate switch that is at least one final destination of the multicast data frame and a second surrogate switch in the hierarchy, wherein the first surrogate switch is one of the plurality of switches in the distributed switch, wherein each of the plurality of switches include at least two bridge elements that are each associated with at least one connection interface on the switches, and
wherein a connection interface of the first surrogate switch is associated with a third bridge element, wherein the connection interface of the first surrogate switch is configured to forward the portion of the multicast data frame from the third bridge element to a fourth bridge element in the first surrogate switch.

2. The computer program product of claim 1, wherein the first surrogate switch is assigned in the hierarchy to a subset of the plurality of switches and wherein the second surrogate switch is assigned to a subset of the subset of switches assigned to the first surrogate switch.

3. The computer program product of claim 2, wherein the first and second surrogate switches increase an available bandwidth used for forwarding the portion of the multicast data frame within the distributed switch by forwarding the portion of the multicast data frame to at least two switches in the distributed switch in parallel using at least two respective connection interfaces.

4. The computer program product of claim 2, wherein the computing device is included within a multicast group associated with the multicast data frame.

5. The computer program product of claim 1, further comprising computer-readable program code configured to select one of the bridge elements of the first surrogate switch as a surrogate bridge element that receives the forwarded portion of the multicast data frame from the ingress switch, wherein the surrogate bridge element is selected based on a measured performance metric.

6. A distributed switch comprising a plurality of switches, comprising:
   an ingress switch of the plurality of switches configured to receive a multicast data frame on a receiving port and determine destination switches of the plurality of switches that should receive at least a portion of the multicast data frame, wherein the receiving port of the ingress switch is associated with a first bridge element, wherein the portion of the multicast data frame is at least a portion of a payload of the multicast data frame, and wherein at least one connection interface in the ingress switch is configured to forward the portion of the multicast data frame from the first bridge element to a second bridge element in the ingress switch; and
   a first surrogate switch in a hierarchy of switches selected from the plurality of switches, wherein the first surrogate switch is configured to receive the portion of the multicast data frame from the ingress switch, wherein the first surrogate switch is assigned in the hierarchy to forward the portion of the multicast data frame to both of: a computing device coupled to the first surrogate switch that is at least one final destination of the multicast data frame and a second surrogate switch in the hierarchy, wherein each of the plurality of switches include at least two bridge elements that are each associated with at least one connection interface on the switches, and
   wherein a connection interface of the first surrogate switch is associated with a third bridge element, wherein the connection interface of the first surrogate switch is configured to forward the portion of the multicast data frame from the third bridge element to a fourth bridge element in the first surrogate switch.

7. The distributed switch of claim 6, wherein the first surrogate switch is assigned in the hierarchy to a subset of the plurality of switches and wherein the second surrogate switch is assigned to a subset of the subset of switches assigned to the first surrogate switch.

8. The distributed switch of claim 7, wherein the first and second surrogate switches increase an available bandwidth used for forwarding the portion of the multicast data frame within the distributed switch by forwarding the portion of the multicast data frame to at least two switches in the distributed switch in parallel using at least two respective connection interfaces.

9. The distributed switch of claim 7, wherein the computing device is included within a multicast group associated with the multicast data frame.

10. The distributed switch of claim 6, further comprising a controller that selects one of the bridge elements of the first surrogate switch as a surrogate bridge element that receives the portion of the multicast data frame from the ingress switch, wherein the surrogate bridge element is selected based on a performance metric.

11. A distributed switch comprising a plurality of switches that each have a direct connection to each other, comprising:
   an ingress switch of the plurality of switches configured to receive a multicast data frame on a receiving port and determine destination switches of the plurality of switches that should receive at least a portion of the multicast data frame, wherein the receiving port of the ingress switch is associated with a first bridge element, wherein the portion of the multicast data frame is at least a portion of a payload of the multicast data frame, and wherein at least one connection interface in the ingress switch is configured to forward the portion of the multicast data frame from the first bridge element to a second bridge element in the ingress switch; and
   a first surrogate switch in a hierarchy of switches, wherein the ingress switch is configured to transmit the portion of the multicast data frame to the first surrogate switch instead of transmitting the portion of the multicast data frame directly to all of the destination switches, wherein the first surrogate switch is assigned in the hierarchy to forward the portion of the multicast data frame to at least one of: one of the destination switches and a second surrogate switch in the hierarchy, wherein each of the plurality of switches include at least two bridge elements that are each associated with at least one connection interface on the switches, and
   wherein a connection interface of the first surrogate switch is associated with a third bridge element, wherein the connection interface of the first surrogate switch is configured to forward the portion of the multicast data frame from the third bridge element to a fourth bridge element in the first surrogate switch.

* * * * *